United States Patent [19]
Lee

[11] Patent Number: 5,636,351
[45] Date of Patent: Jun. 3, 1997

[54] PERFORMANCE OF AN OPERATION ON WHOLE WORD OPERANDS AND ON OPERATIONS IN PARALLEL ON SUB-WORD OPERANDS IN A SINGLE PROCESSOR

[75] Inventor: Ruby B. Lee, Los Altos Hills, Calif.

[73] Assignee: Hewlett-Packard Company, Palo Alto, Calif.

[21] Appl. No.: 390,908

[22] Filed: Feb. 17, 1995

Related U.S. Application Data

[63] Continuation of Ser. No. 157,346, Nov. 23, 1993, abandoned.

[51] Int. Cl.[6] ............................ G06F 7/42; G06F 7/44; G06F 7/50; G06F 7/52
[52] U.S. Cl. .......................... 395/380; 395/800; 395/376; 364/754; 364/715.08; 364/750.5; 364/768
[58] Field of Search ....................... 395/800, 375, 395/380; 364/754, 715.08, 750.5, 768

[56] References Cited

U.S. PATENT DOCUMENTS

| | | | |
|---|---|---|---|
| 4,128,872 | 12/1978 | Prioste | 395/800 |
| 4,754,412 | 6/1988 | Deering . | |
| 4,864,529 | 9/1989 | Shah et al. | 364/760 |
| 4,901,268 | 2/1990 | Judd | 364/745 |
| 4,953,119 | 8/1990 | Wong et al. | 364/754 |
| 4,958,313 | 9/1990 | Uhlenhoff | 364/757 |
| 4,967,339 | 10/1990 | Fukumaru et al. | 395/800 |
| 5,020,013 | 5/1991 | Maher et al. | 364/715.08 |
| 5,047,975 | 9/1991 | Patti et al. | 364/786 |
| 5,060,183 | 10/1991 | Sakashita et al. | 364/757 |
| 5,126,964 | 6/1992 | Zurawski | 364/757 |
| 5,163,139 | 11/1992 | Haigh et al. | 395/375 |
| 5,189,636 | 2/1993 | Patti et al. | 364/786 |
| 5,203,002 | 4/1993 | Wetzel | 395/800 |
| 5,218,564 | 6/1993 | Covey | 364/750.5 |
| 5,222,037 | 6/1993 | Taniquchi | 364/748 |
| 5,247,471 | 9/1993 | Hilker et al. | 364/748 |
| 5,257,218 | 10/1993 | Poon | 364/787 |
| 5,268,855 | 12/1993 | Mason et al. | 364/748 |
| 5,327,369 | 7/1994 | Ashkenazi | 364/787 |

FOREIGN PATENT DOCUMENTS

| | | |
|---|---|---|
| 0239899 | 10/1987 | European Pat. Off. . |
| 0395348 | 10/1990 | European Pat. Off. . |
| 0 430 441 A3 | 6/1991 | European Pat. Off. . |
| 0577483 | 1/1994 | European Pat. Off. . |
| 2172129 | 9/1986 | United Kingdom . |
| 2215496 | 9/1989 | United Kingdom . |
| WO-A-8905010 | 6/1989 | WIPO . |

OTHER PUBLICATIONS

Michael Flynn, Very High–Speed Computing Systems, *Proceedings of IEEE*, vol. 54, No. 12, Dec. 1966, pp. 1901–1909.

Ruby B. Lee, Precision Architecture, *IEEE Computer*, vol. 22, No. 1, Jan. 1989, pp. 78–91.

John Hennessy & David Patterson, *Computer Architecture, A Quantitative Approach*, Morgan Kaufmann, 1990, Appendix, pp. A–39 through A–49.

*Primary Examiner*—Krisna Lim
*Assistant Examiner*—Saleh Najjar

[57] ABSTRACT

A system allows parallel data processing within a single processor. In order to allow for parallel processing of data, an arithmetic logic unit or other operation executing entity within the processing system such as a shifter is partitioned. Within each partition operations are performed on a portion of one or more operands. When the operation is to be performed on full word length operands, there is no parallel processing. Thus data is allowed to freely propagate across boundaries between the partitions. When performing the operation in parallel using a plurality of operands of less than one full word in length, data is prevented from being propagated across at least one boundary between the partitions. The principles of the present invention may also be utilized to implement a multiplier which performs parallel multiplication of partial word multiplicands.

32 Claims, 11 Drawing Sheets

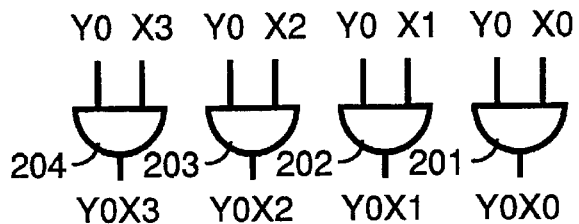
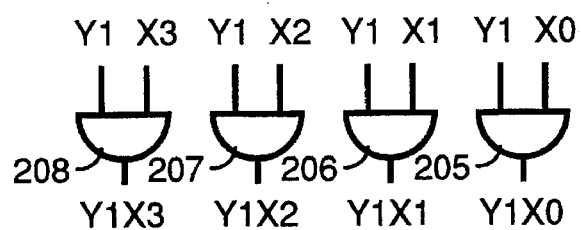
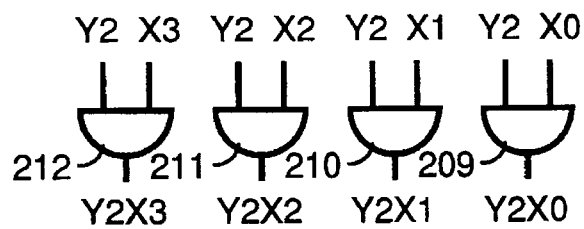
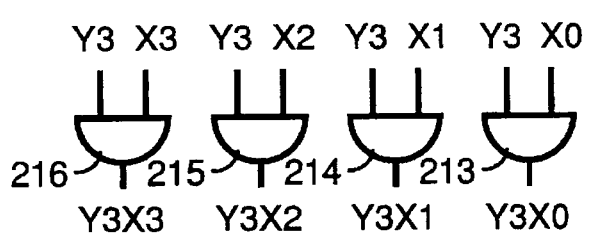
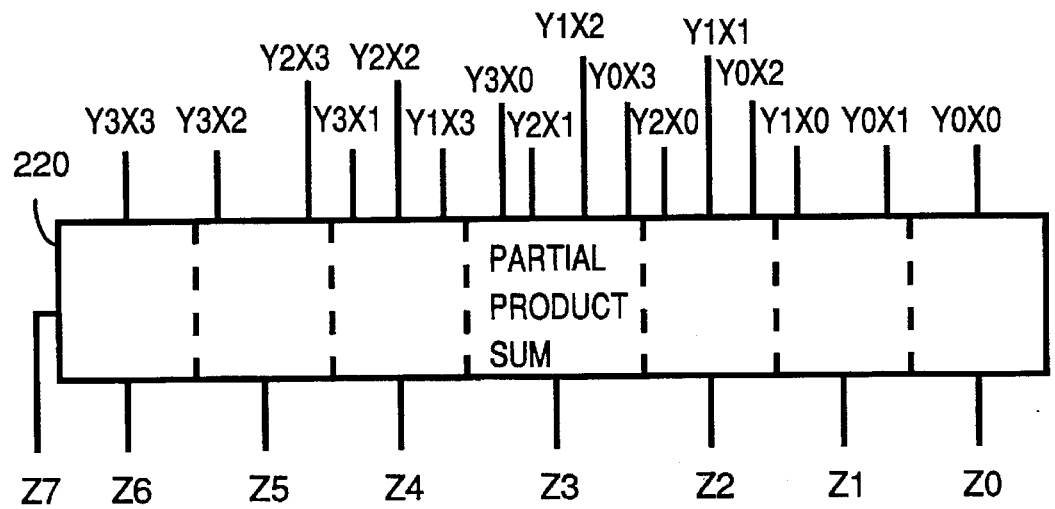
FIGURE 7
(PRIOR ART)

PERFORMANCE OF AN OPERATION ON WHOLE WORD OPERANDS AND ON OPERATIONS IN PARALLEL ON SUB-WORD OPERANDS IN A SINGLE PROCESSOR

This application is a continuation of application Ser. No. 08/157,346, filed Nov. 23, 1993, now abandoned.

BACKGROUND

The present invention concerns parallel data processing in a single processor system.

In general, single processor systems sequentially perform operations on two operands. For example, in a 32-bit computer, each integer operand is 32 bits. In a 64-bit computer, each integer operand is 64 bits. Thus an integer "add" instruction, in a 64-bit computer, adds two 64-bit integer operands to produce a 64-bit integer result. In most pipelined 64-bit processors, a 64-bit add instruction takes one cycle of execution time.

In many instances the pertinent range of operands is 16 bits or less. In current 32-bit and 64-bit computers, however, it still takes a full instruction to perform an operation on a pair of 16-bit operands. Thus the number of execution cycles required to perform an operation on two 16-bit operands is the same as the number of execution cycles required to perform the operation on two 32-bit operands in a 32-bit computer or two 64-bit operands in a 64-bit computer.

In the prior art, parallel data processing required replicating of functional units, each functional unit able to handle full word length data. See for example, Michael Flynn, *Very High-Speed Computing Systems, Proceedings of IEEE*, Vol. 54, No. 12, December 1966, pp. 1901–1909. However, such implementations of parallel processing is significantly costly both in terms of hardware required and complexity in design.

SUMMARY OF THE INVENTION

In accordance with the preferred embodiment of the present invention, a system is presented which allows parallel data processing within a single processor. In order to allow for parallel processing of data, an arithmetic logic unit or other operation executing entity within the processing system such as a shifter is partitioned. Within each partition operations are performed. When the operation is to be performed on full word length operands, there is no parallel processing. Thus data is allowed to freely propagate across boundaries between the partitions. When performing the operation in parallel using a plurality of less than one full word length operands, data is prevented from being propagated across at least one boundary between the partitions.

For example, when the operation is an addition operation (e.g., a two's complement addition), each of the plurality of partitions performs an addition operation. When the addition is to be performed on full word length operands, carries are allowed to propagate between the partitions. When performing the addition operation in parallel on a plurality of less than one full word length operand sets, a carry is prevented from propagating across at least one boundary between the partitions.

Likewise, when the operation is a shift, each of the plurality of partitions performs a shift operation. When the shift is to be performed on full word length operands, shifts are allowed between the partitions. When performing the operation in parallel using a plurality of less than one full word length operands, a shift is prevented from crossing at least one boundary between the partitions.

Also in accordance with a preferred embodiment of the present invention, a multiplier implements both multiplication of whole word multiplicands and parallel multiplication of sub-word multiplicands. Circuitry, for example an array of logic AND gates (or their equivalent), generates partial products. Partial product sum circuitry, sums the partial products to produce a result. Partial product gating means, in response to the selection of parallel multiplication of subword multiplicands, forces selected partial products to have a value of 0, thereby implementing parallel multiplication of sub-word multiplicands. When the multiplier is implementing whole word multiplication, none of the partial products are forced to have a value of 0. The partial product gating means may be implemented, for example, using third inputs to at least a portion of the logic AND gates.

The present invention allows for a single processor system to significantly increase performance by facilitating parallel processing operations when operands are less than the full word length. This inexpensive use of parallelism results in a huge increase in performance for computations that can utilize this type of data parallelism without significant additional cost in silicon space on a processor chip or complexity in design. The present invention also allows for parallel processing operations performed by a processor in response to a single instruction.

BRIEF DESCRIPTION OF THE DRAWINGS

FIG. 7 shows a multiplier in accordance with the prior art.

DESCRIPTION OF THE PREFERRED EMBODIMENTS

Figure 1:
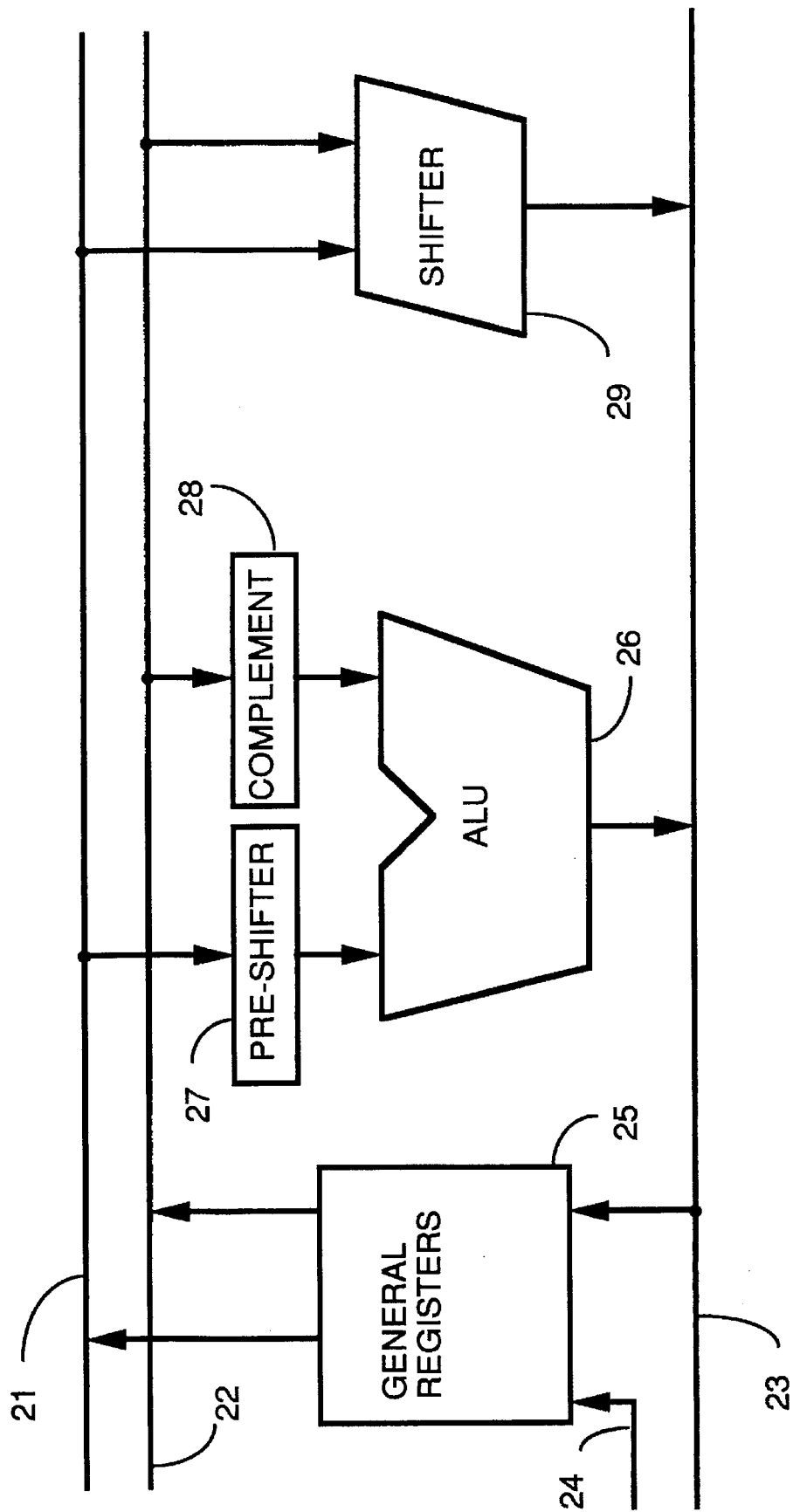
FIG. 1 shows a simplified block diagram of an operation execution data path within a processor in accordance with preferred embodiments of the present invention.

FIG. 1 shows a simplified block diagram of an operation execution data path within a processor in accordance with preferred embodiments of the present invention. Operands for upcoming operations and results from accomplished operations are stored within general registers 25. When operations are performed, a first operand stored in a first register within general registers 25 is placed on a first source bus 21. If the operation requires another operand, a second operand stored in a second register within general registers 25 is placed on a second source bus 22.

After performance of the operation, the result is placed on a result bus 23 and loaded into a register within general registers 25. The operation is performed by arithmetic logic unit (ALU) 26 or by a shifter 29. A pre-shifter 27 and complement circuitry 28 may each be used to modify operands before they are received by ALU 26. For general background about the architecture of single processor systems constructed similarly to the present invention see, for example, Ruby B. Lee, *Precision Architecture, IEEE Computer*, Volume 22, No. 1, January 1989, pp. 78–91.

Figure 2:
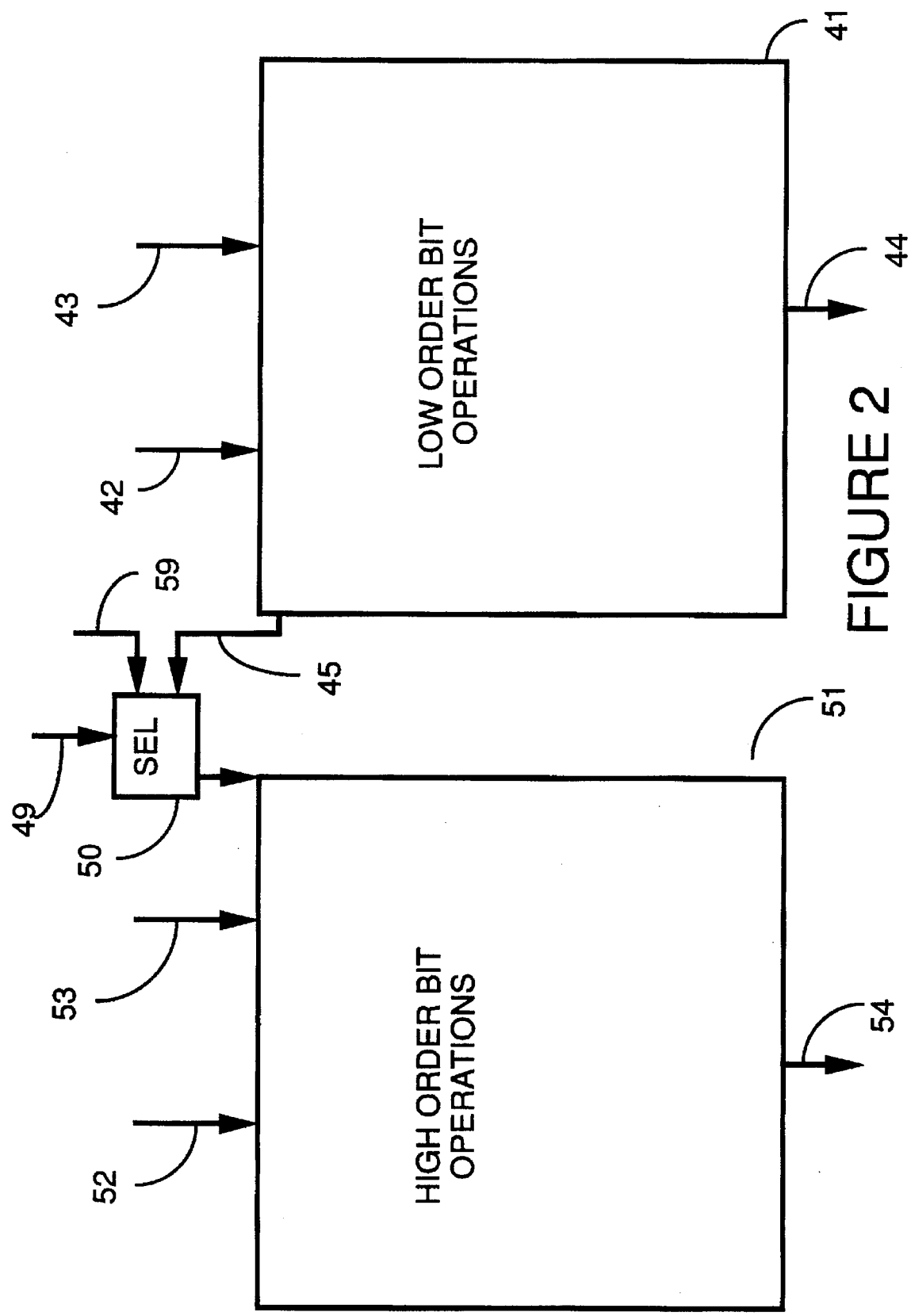
FIG. 2 shows a simplified block diagram of an arithmetic logic unit (ALU) shown in FIG. 1 in accordance with a preferred embodiment of the present invention.

In accordance with the preferred embodiments of the present invention, the ALU may be partitioned to allow parallel data processing. For example, FIG. 2 shows ALU 26 divided into two partitions. A first partition 41 performs operations on low order bits 42 of a first operand and low order bits 43 of a second operand to produce low order bit results 44. A second partition 51 performs operations on high order bits 52 of the first operand and high order bits 53 of the second operand to produce high order bit results 54.

In response to a control input 49, a selector 50 is used to allow information on data path 45 to propagate from first partition 41 to second partition 51 or to intercept information on data path 45 before it is propagated from first partition 41 to second partition 51. Particularly, for arithmetic operations performed on full-word operands, information is allowed to propagate from first partition 41 through selector 50 to second partition 51. For the performance of parallel arithmetic operations on half-word operands, selector 50 prevents information from propagating from first partition 41 to second partition 51. Generally, in logic operations, there is no propagation of information from first partition 41 to second partition 51.

For example, in a computer which has a thirty-two bit wide data path, each full-word operand is 32 bits. Therefore, when performing operations using 32-bit full word operands, selector 50 allows information to propagate from first partition 41 through selector 50 to second partition 51. When performing two parallel operations using 16-bit half word operands, selector 50 prevents information from propagating from first partition 41 through selector 50 to second partition 51. Instead the value on a line 59 is forwarded to partition 51. When an "add" is being performed, a logic 0 is placed on input line 59. When a "subtract" is being performed, a logic 1 is placed on input line 59.

In the preferred embodiment of the present invention, a common arithmetic operation performed by ALU 26, shown in FIG. 1, is two's complement addition. As is understood by those skilled in the art, the use of two's complement circuitry 28 to perform a two's complement on an operand before performing a two's complement addition operation in the ALU implements a two's complement subtraction. Also, the use of pre-shifter 27 to pre-shift an operand before performing a two's complement addition operation in the ALU implements a shift and add operation.

Figure 3:
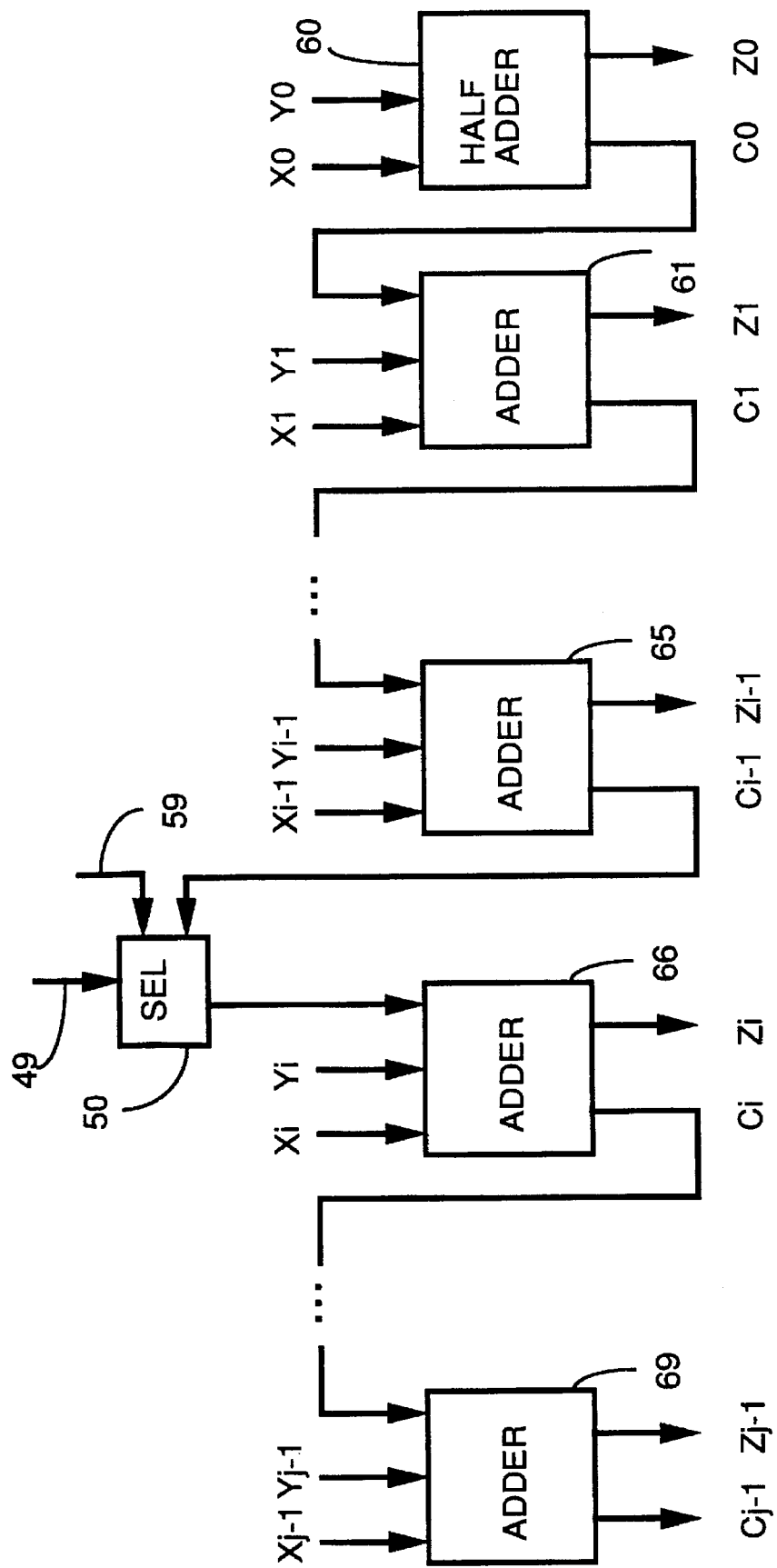
FIG. 3 shows an implementation of a two's complement adder within the ALU shown in FIG. 2 in accordance with a preferred embodiment of the present invention.

FIG. 3 shows implementation of a two's complement adder with carry propagate addition within ALU 26 in accordance with a preferred embodiment of the present invention. Alternately, ALU 26 includes a two's complement adder with carry look-ahead. A half adder 60 receives a single bit $X_0$ of a first operand and a single bit $Y_0$ of a second operand. Half adder 60 produces a sum bit $Z_0$ and a carry bit $C_0$. A full adder 61 receives a single bit $X_1$ of the first operand, a single bit $Y_1$ of the second operand and carry bit $C_0$. Full adder 61 produces a sum bit $Z_1$ and a carry bit $C_1$. A full adder 65 receives a single bit $X_{i-1}$ of the first operand, a single bit $Y_{i-1}$ of the second operand and a carry bit from a previous adder (i.e., $C_{i-2}$, not shown). Full adder 65 produces a sum bit $Z_{i-1}$ and a carry bit $C_{i-1}$. A full adder 66 receives a single bit $X_i$ of the first operand and a single bit $Y_i$ of the second operand. Depending on a value of enable bit 49, full adder 66 also receives, through selector 50 (or equivalent logic circuitry as will be understood by persons of ordinary skill in the art), carry bit $C_{i-1}$. Full adder 66 produces a sum bit $Z_i$ and a carry bit $C_i$. A full adder 69 receives a single bit $X_{j-1}$ of the first operand, a single bit $Y_{j-1}$ of the second operand and a carry bit from a previous adder (not shown). Full adder 69 produces a sum bit $Z_{j-1}$ and a carry bit $C_{j-1}$.

In the embodiment of the adder shown in FIG. 3, "j" is the size of the data path and the bit length of full word operations. Also, "i" is equal to "j" divided by 2. For example, "j" is equal to 32 and "i" is equal to 16.

Selector 50 is also shown in FIG. 3. When performing operations using "j"-bit full word operands, enable bit 49 is equal to logic one and allows a carry to propagate through selector 50 to full adder 66. When performing two parallel operations using "i"-bit half word operands, enable bit 49 is equal to logic zero and prevents the carry from propagating through selector 50 to full adder 66. Instead the value on line 59 is forwarded to full adder 66. When an "add" is being performed, a logic 0 is placed on input line 59. When a "subtract" is being performed, a logic 1 is placed on input line 59.

Figure 4:
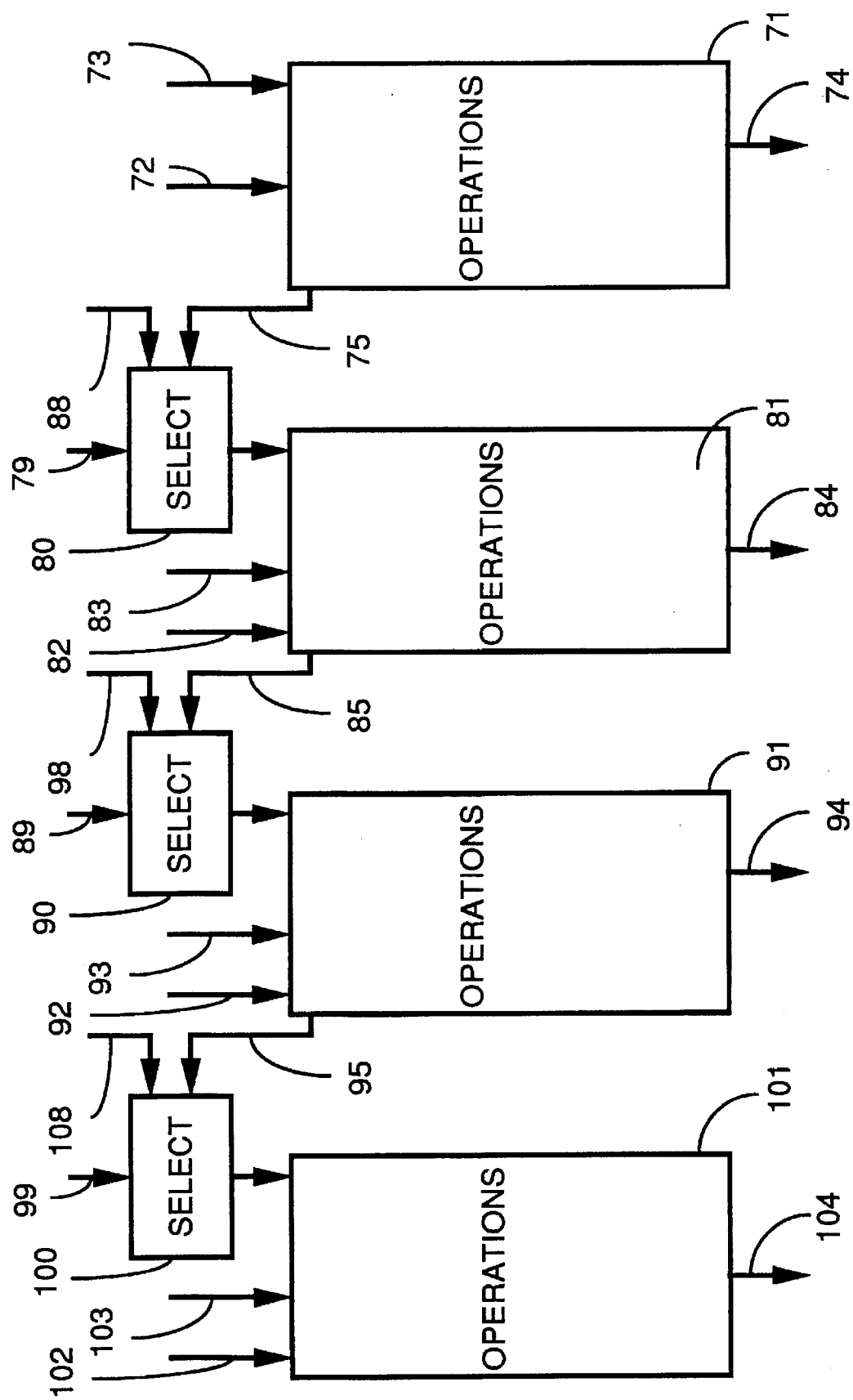
FIG. 4 shows an alternate simplified block diagram of the arithmetic logic unit (ALU) shown in FIG. 1 in accordance with an alternate preferred embodiment of the present invention.

While FIGS. 2 and 3 discuss implementations of ALU 26 with two partitions, an ALU designed in accordance with other preferred embodiments of the present invention may variously partition an ALU. For example, FIG. 4 shows an alternate simplified block diagram of ALU 26 in accordance with an alternate preferred embodiment of the present invention. In FIG. 4, ALU 26 is divided into four partitions. A first partition 71 performs operations on low order bits 72 of a first operand and low order bits 73 of a second operand to produce low order bit results 74. A second partition 81 performs operations on bits 82 of the first operand and bits 83 of the second operand to produce result bits 84. A third partition 91 performs operations on bits 92 of the first operand and bits 93 of the second operand to produce result bits 94. A fourth partition 101 performs operations on high order bits 102 of the first operand and high order bits 103 of the second operand to produce high order bit results 104.

In response to a control input 79, a selector 80 is used to allow information on data path 75 to propagate from first partition 71 to second partition 81 or to intercept information on data path 75 before it is propagated from first partition 71 to second partition 81. Particularly, for arithmetic operations performed on full-word operands or half-word operands, information is allowed to propagate from first partition 71 through selector 80 to second partition 81. For the performance of parallel arithmetic operations on quarter-word operands, selector 80 prevents information from propagating from first partition 71 to second partition 81. Instead the value on a line 88 is forwarded to partition 81. When an "add" is being performed, a logic 0 is placed on line 88. When a "subtract" is being performed, a logic 1 is placed on line 88. Generally, in logic operations, there is no propagation of information between partitions.

In response to a control input 89, a selector 90 is used to allow information on data path 85 to propagate from second partition 81 to third partition 91 or to intercept information on data path 85 before it is propagated from second partition 81 to third partition 91. Particularly, for arithmetic operations performed on full-word operands, information is allowed to propagate from second partition 81 through selector 90 to third partition 91. For the performance of parallel arithmetic operations on quarter-word operands or half-word operands, selector 90 prevents information from propagating from second partition 81 to third partition 91. Instead the value on a line 98 is forwarded to partition 91. When an "add" is being performed, a logic 0 is placed on line 98. When a "subtract" is being performed, a logic 1 is placed on line 98.

In response to a control input 99, a selector 100 is used to allow information on data path 95 to propagate from third partition 91 to fourth partition 101 or to intercept information on data path 95 before it is propagated from third partition 91 to fourth partition 101. Particularly, for arithmetic operations performed on full-word operands and half-word operands, information is allowed to propagate from third partition 91 through selector 100 to fourth partition 101. For the performance of parallel arithmetic operations on quarter-word operands, selector 100 prevents information from propagating from third partition 91 to fourth partition 101. Instead the value on a line 108 is forwarded to partition 101. When an "add" is being performed, a logic 0 is placed on line 108. When a "subtract" is being performed, a logic 1 is placed on line 108.

For example, in a computer which has a sixty-four bit wide data path, each full-word operand is 64 bits. Therefore, when performing operations using 64-bit full word operands, selector 80 allows information to propagate from first partition 71 through selector 80 to second partition 81, selector 90 allows information to propagate from second partition 81 through selector 90 to third partition 91, and selector 100 allows information to propagate from third partition 91 through selector 100 to fourth partition 101. When performing two parallel operations using 32-bit half word operands, selector 80 allows information to propagate from first partition 71 through selector 80 to second partition 81, selector 90 prevents information from propagating from second partition 81 through selector 90 to third partition 91, and selector 100 allows information to propagate from third partition 91 through selector 100 to fourth partition 101. When performing four parallel operations using 16-bit quarter word operands, selector 80 prevents information from propagating from first partition 71 through selector 80 to second partition 81, selector 90 prevents information from propagating from second partition 81 through selector 90 to third partition 91, and selector 100 prevents information from propagating from third partition 91 through selector 100 to fourth partition 101.

Figure 5:
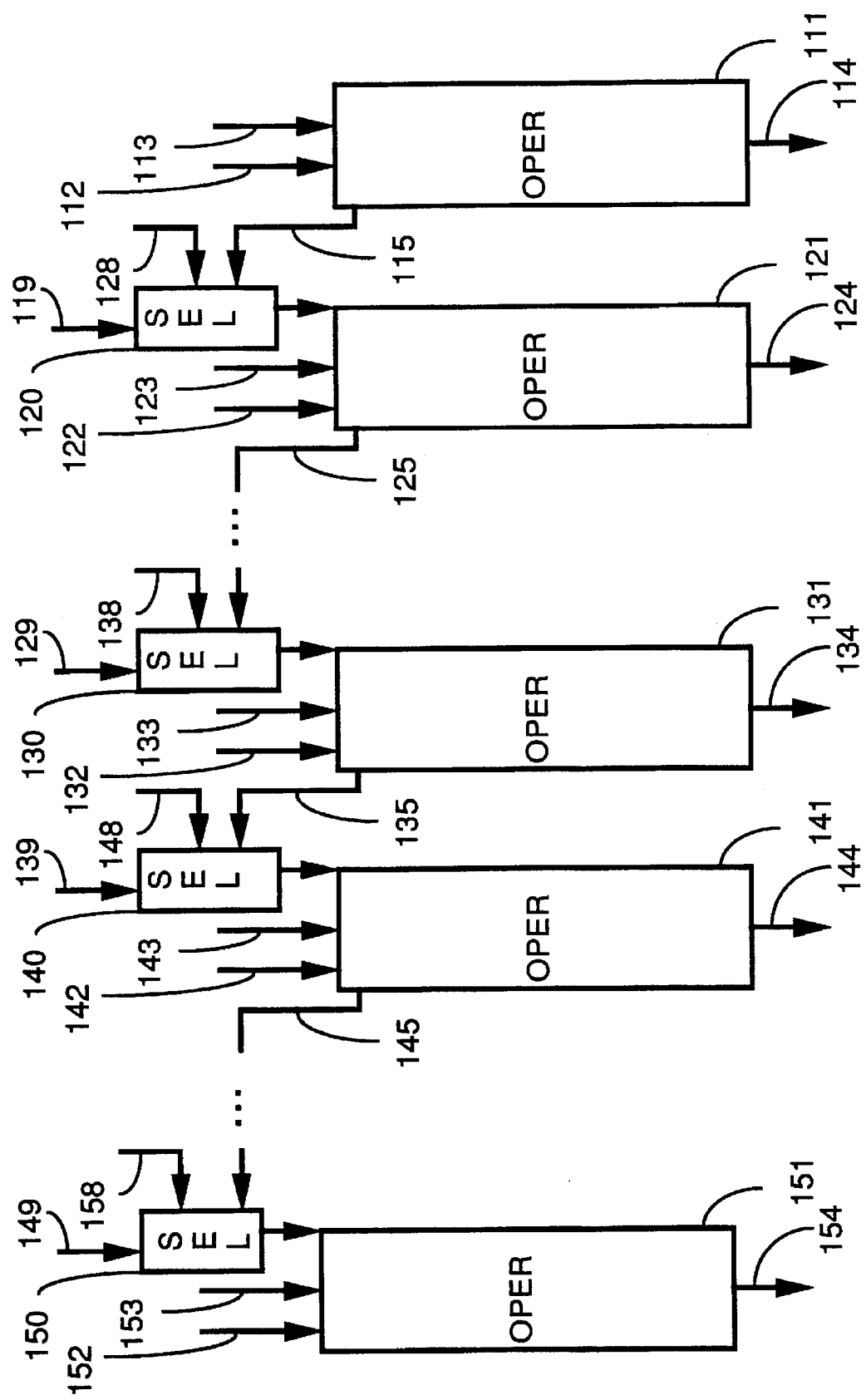
FIG. 5 shows another alternate simplified block diagram of the arithmetic logic unit (ALU) shown in FIG. 1 in accordance with another alternate preferred embodiment of the present invention.

FIG. 5 shows an another alternate simplified block diagram of ALU 26 in accordance with another alternate preferred embodiment of the present invention. In FIG. 5, ALU 26 is divided into partitions which are each one bit wide. A first partition 111 performs operations on a low order bit 112 of a first operand and on a low order bit 113 of a second operand to produce a low order result bit 114. A second partition 121 performs operations on a bit 122 of the first operand and a bit 123 of the second operand to produce a result bit 124. A partition 131 performs operations on a bit 132 of the first operand and a bit 133 of the second operand to produce a result bit 134. A partition 141 performs operations on a bit 142 of the first operand and a bit 143 of the second operand to produce a result bit 144. A partition 151 performs operations on a high order bit 152 of the first operand and a high order bit 153 of the second operand to produce a high order result bit 154.

In response to a control input 119, a selector 120 is used to allow information on data path 115 to propagate from first partition 111 to second partition 121 or to intercept information on data path 115 before it is propagated from first partition 111 to second partition 121. When data is intercepted the value on a line 128 is forwarded to partition 121. When an "add" is being performed, a logic 0 is placed on line 128. When a "subtract" is being performed, a logic 1 is placed on line 128.

In response to a control input 129, a selector 130 is used to allow information on a data path from an immediately prior partition (not shown) to propagate from the immediately prior partition to partition 131 or to intercept information on the data path from the immediately prior partition before it is propagated to partition 13 1. When data is intercepted the value on a line 138 is forwarded to partition 131. When an "add" is being performed, a logic 0 is placed on line 138. When a "subtract" is being performed, a logic 1 is placed on line 138.

In response to a control input 139, a selector 140 is used to allow information on data path 135 to propagate from partition 131 to partition 141 or to intercept information on data path 135 before it is propagated from partition 131 to partition 141. When data is intercepted the value on a line 148 is forwarded to partition 141. When an "add" is being performed, a logic 0 is placed on line 148. When a "subtract" is being performed, a logic 1 is placed on line 148.

In response to a control input 149, a selector 150 is used to allow information on a data path from an immediately prior partition (not shown) to propagate from the immediately prior partition to partition 151 or to intercept information on the data path from the immediately prior partition before it is propagated to partition 151. When data is intercepted the value on a line 158 is forwarded to partition 151. When an "add" is being performed, a logic 0 is placed on line 158. When a "subtract" is being performed, a logic 1 is placed on line 158.

The control inputs to the selectors may be used to allow parallel processing of operands of varying length. For example, in a processing system with a sixty-four bit wide data path, the control inputs could be selected so that parallel processing of two sixteen bit and four eight-bit arithmetic operations are all performed simultaneously. Additionally any bit combination which add up to no more than the word size could be used. For example, parallel processing of seventeen bit, three bit, sixteen bit, twelve bit, five bit, and eleven bit arithmetic operations can also be performed simultaneously.

Figure 10:
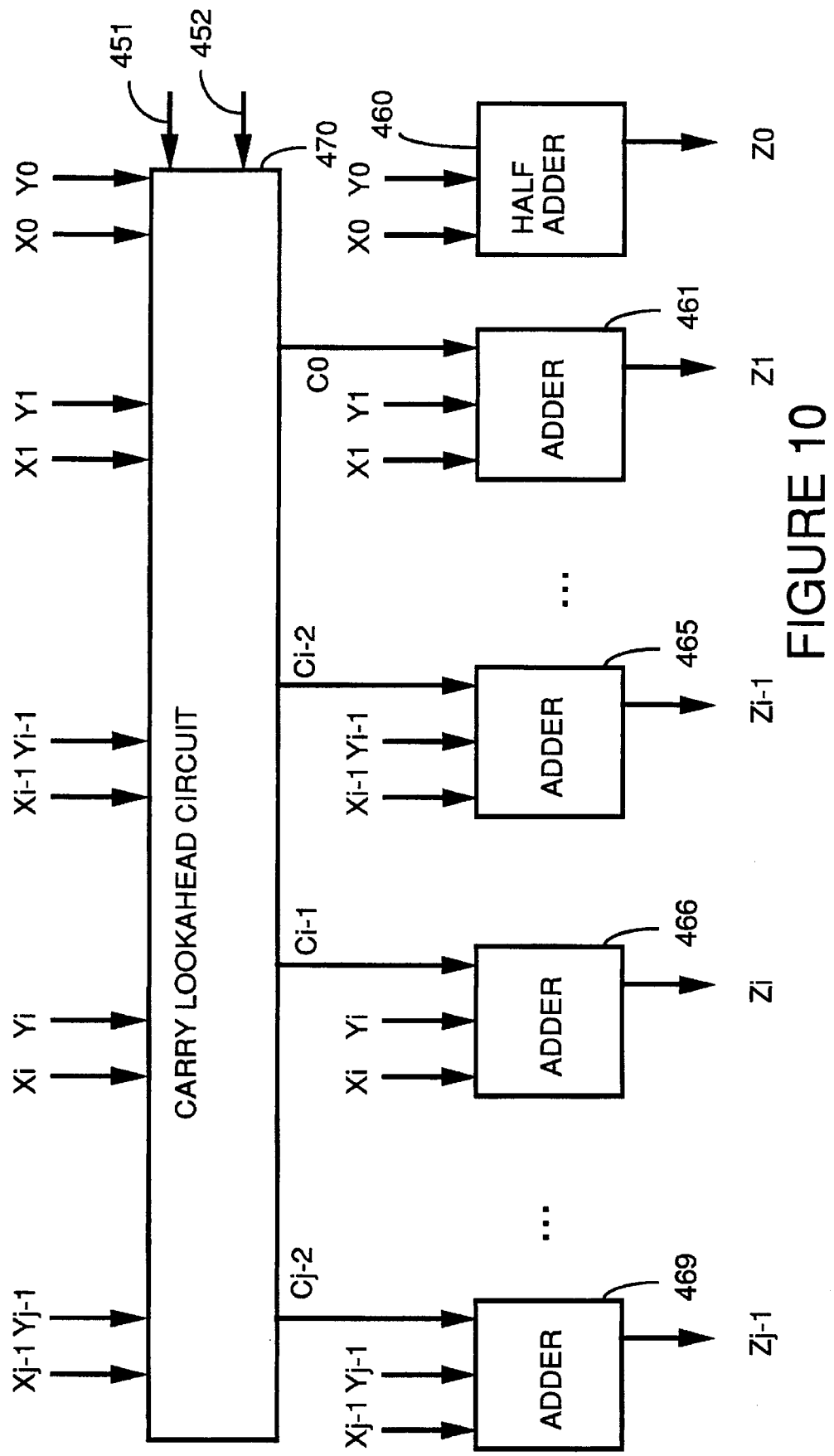
FIG. 10 shows an implementation of a carry look-ahead adder within the ALU shown in FIG. 1 in accordance with an alternate preferred embodiment of the present invention.

The principles discussed above also apply to a carry look-ahead adder. For example, FIG. 10 shows implementation of a two's complement adder with carry look-ahead within ALU 26 in accordance with another preferred embodiment of the present invention. A carry look-ahead circuit 470 produces carries for the adder. A half adder 460 receives a single bit $X_0$ of a first operand and a single bit $Y_0$ of a second operand. Half adder 460 produces a sum bit $Z_0$. A full adder 461 receives a single bit $X_1$ of the first operand, a single bit $Y_1$ of the second operand and a carry bit carry bit $C_0$. Full adder 461 produces a sum bit $Z_1$. A full adder 465 receives a single bit $X_{i-1}$ of the first operand, a single bit $Y_{i-1}$ of the second operand and a carry bit $C_{i-2}$. Full adder 465 produces a sum bit $Z_{i-1}$. A full adder 466 receives a single bit $X_i$ of the first operand, a single bit $Y_i$ of the second operand and a carry bit $C_{i-1}$. Full adder 466 produces a sum bit $Z_i$. A full adder 469 receives a single bit $X_{j-1}$ of the first operand, a single bit $Y_{j-1}$ of the second operand and a carry bit $C_{j-2}$. Full adder 469 produces a sum bit $Z_{j-1}$.

In the embodiment of the adder shown in FIG. 10, "j" is the size of the data path and the bit length of full word operations. Also, "i" is equal to "j" divided by 2. For example, "j" is equal to 32 and "i" is equal to 16. Alternately, when j is equal to 32, i may be equal to any integer less than 32.

When performing operations using "j"-bit full word operands, an enable bit 452 is equal to logic one and allows all carries to propagate. When performing two parallel operations using "i"-bit sub-word operands partitioned between bits i and i+1, enable bit 452 is equal to logic zero and prevents the carry propagating across the partition boundary. Instead the value on line 451 is used as the value forwarded to full adder 466. When an "add" is being performed, a logic 0 is placed on input line 451. When a "subtract" is being performed, a logic 1 is placed on input line 451.

Operation of carry look-ahead adders are well understood in the art. For example, suppose A[i] is one bit of an input, B[i] is one bit of the other input and S[i] is one bit of the sum from the adder. Then, the sum from one bit of the adder is given by Equation 1 below:

$$S[i]=A[i] \text{ XOR } B[i] \text{ XOR } C[i-1] \quad \text{Equation 1}$$

In equation 1, C[i−1] is the carry out of the previous bits of the carry look-ahead adder. The carry look-ahead adder works on generating these carry bits quickly.

Let G[i] be a signal which signifies that a carry is to be generated by this bit and P[i] be a signal that a carry may propagate from the previous bits to the output of this bit. These are determined in accordance with Equation 2 below:

$$G[i]=A[i] \text{ AND } B[i]; \quad \text{Equation 2}$$
$$P[i]=A[i] \text{ OR } B[i];$$

Therefore, for four bits within a carry look-ahead adder, the carry bits may be generated as in Equation 3 below:

$$
\begin{aligned}
C[i] &= G[i]+P[i] * (G[i-1]+P[i-1]) * (G[i-2]+P[i-2]) * (G[i-3]+P[i-3]) * C[i-4]))) \\
C[i-1] &= G[i-1]+P[i-1] * (G[i-2]+P[i-2]) * (G[i-3]+P[i-3]) * C[i-4])) \\
C[i-2] &= G[i-2]+P[i-2] * (G[i-3]+P[i-3]) * C[i-4]) \\
C[i-3] &= G[i-3]+P[i-3] * C[i-4]
\end{aligned}
\quad \text{Equation 3}
$$

In equation 3 above, "*" is equivalent to a logic AND operation and "+" is equivalent to a logic OR operation.

When implementing a preferred embodiment of the present invention, a carry is stopped at a particular bit if the Generate G[i] and Propagate P[i] are forced to be false. For instance, in equation 3 above, if G[i−3] and P[i−3] are false, C[i−3] will be false and C[i−4] can never effect the value of C[i−2], C[i−1], and C[i]. Likewise, if G[i−2] and P[i−2] are false, C[i−2] will be false and G[i−3] and P[i−3] and C[i−4] can never effect the value of C[i−1] and C[i].

If we let M [i] be a mask bit that breaks the carry-chain between bit [i] and bit [i+1] when M [i] is 1, then a new Equation 4 can be generated as follows:

$$Gm[i]=!M[i]*(A[i]*B[i]) \quad \text{Equation 4}$$
$$Pm[i]=!M[i]*(A[i]+B[i])$$

Now if M [i] is 1, a carry will not be allowed to be generated from bit [i] or to propagate through bit [i].

For subtraction by creating the one's complement of one of the operands and adding it to the other operand with a carry in (two's complement arithmetic), a carry must be forced to be generated in a bit when M[i] is 1.

Let F be a signal that when true will force a carry to be generated in a bit when M [i] is 1. The equation for Gs[i] and Ps[i] becomes as set out in Equation 5 below:

$$
\begin{aligned}
Gs[i] &= (M[i]*F)+(!M[i]*(A[i]*B[i])) \\
&= (M[i]*F)+(!M[i]*G[i]) \\
Ps[i] &= Pm[i]
\end{aligned}
\quad \text{Equation 5}
$$

Now if M[i] is 1, the value of Gs[i] is determined by F. If M [i] is 0 the value of Gs[i] is determined by A[i] and B[i] as it was previously. The propagate does not have to be forced by the F signal.

The equation of the carry out is given by Equation 6 below:

$$C[i]=Gs[i]+Ps[i]*C[i-1] \quad \text{Equation 6}$$

Figure 6:
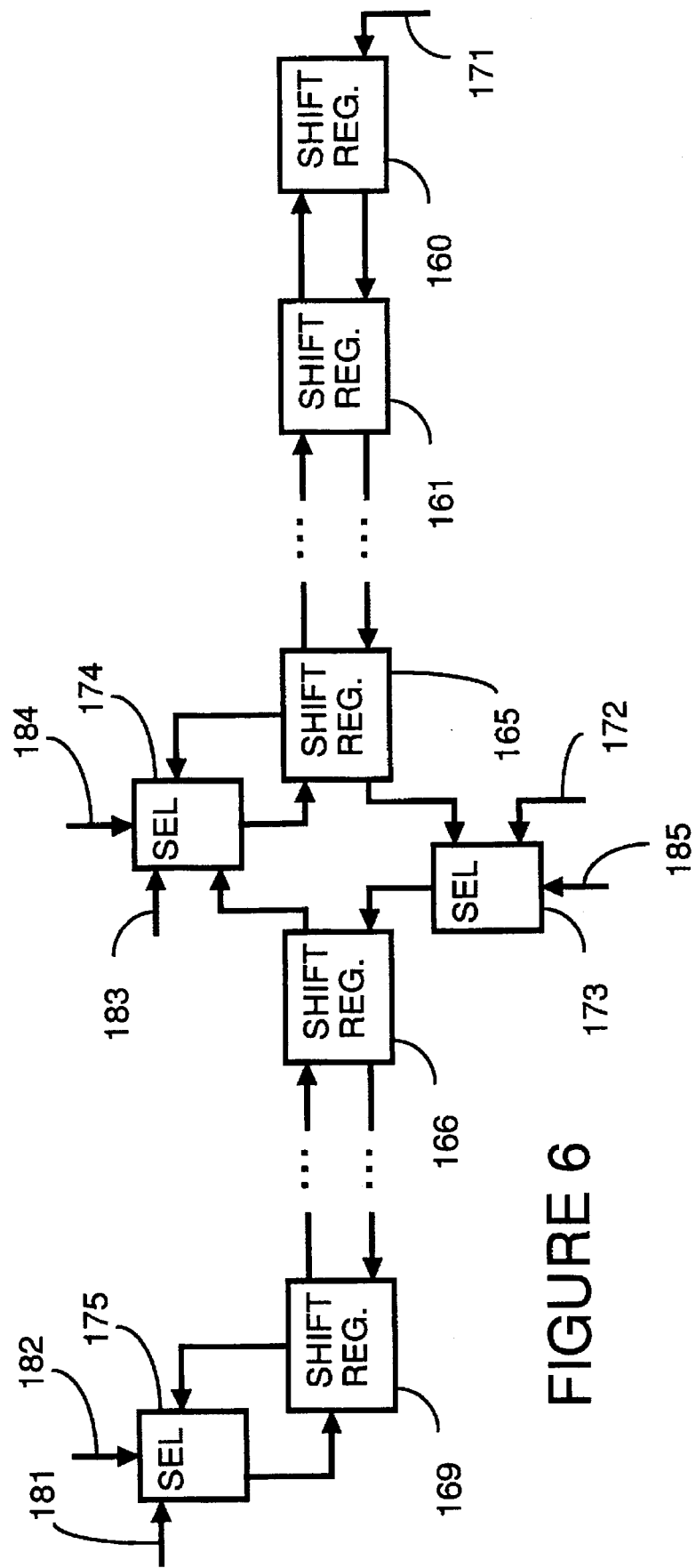
FIG. 6 shows an implementation of a shifter shown in FIG. 1 in accordance with a preferred embodiment of the present invention.

As will be understood by persons of skill in the art, principles of the present invention are not confined to arithmetic operations within computer system ALUs. For example, partitioning as shown in the ALU may also be extended to other entities within the computer system which operate on data. For example, FIG. 6 shows the present invention embodied in pre-shifter 27. The same embodiment of the present invention may also be used to implement shifter 29. Partitioning of pre-shifter 27 and shifter 29 allows, for example, for the implementation of parallel shift-and-add operations and parallel shift operations.

Pre-shifter 27 is shown to include a shift register one-bit slice 160, a shift register one-bit slice 161, a shift register one-bit slice 165, a shift register one-bit slice 166 and a shift register one-bit slice 169.

When data is shifted to the left, a datum on input 171, typically a logic 0 value, is used as input to shift register one-bit slice 160. When data is shifted to the right, a selector 175 in response to a control input 182 selects either a datum on input 181 (a logic 0 value or a logic 1 value) or selects the value currently stored by shift register one-bit slice 169 to be input to shift register one-bit slice 169.

Wherever the shifter is to be partitioned, additional selectors are added to the shifter. For example, FIG. 6 shows the shifter partitioned between shift register one-bit slice 165 and shift register one-bit slice 166. There a selector 174 and a selector 173 have been added. For shift operations on partitioned operands, when data is shifted to the left, selector 173, in response to a control input 185, selects a datum on input 172, typically a logic 0 value, to be used as input to shift register one-bit slice 166. For shift operations on full word operands, when data is shifted to the left, selector 173 selects output from shift register one-bit slice 165 to be used as input to shift register one-bit slice 166.

For shift operations on partitioned operands, when data is shifted to the right, selector 174 in response to a control input 184 selects either a datum on input 183 (a logic 0 value or a logic 1 value) or selects the value currently stored by shift register one-bit slice 166 to be input to shift register one-bit slice 165. For shift operations on full word operands, when data is shifted to the right, selector 174 selects output from shift register one-bit slice 166 to be used as input to shift register one-bit slice 165.

FIG. 6 shows a shifter with only two partitions. As will be understood from the foregoing discussion of partitions in an ALU, the shifter can be partitioned in a variety of ways. For example, a 64-bit shifter may be partitioned into two, four, eight, sixteen, thirty-two or sixty-four bit equal size partitions. Additionally, it is not a requirement of the present invention that partitions each operate on equal number of bits.

While the above embodiment describes the pre-shifter 27 and shifter 29 implemented as a shift register consisting of a series of one bit slices, alternative preferred embodiments are pre-shifters and shifters implemented with multiplexors. Typically, pre-shifter 27 is implemented by a one level of multiplexors, since it can usually shift by at most a small number of bits, for example, 0, 1, 2, 3 or 4 bits. Shifter 29 is typically implemented by three levels of multiplexors, where each level of multiplexor is a four-to-one multiplexor. For example, in a 64-bit shifter 29, the first level of multiplexors will shift either 0, 16, 32 or 48 bits. The second level of multiplexors can shift either 0, 4, 8 or 12 bits. The third level of multiplexors can shift 0, 1, 2 or 3 bits. This gives a shift of any number of bits from 0 to 63. In such a shifter built up of 3 stages of multiplexors, one-bit slices can still be identified. However the blocking of the shifts between any two bits may need to be done in one or more of the three multiplexer stages, as will be understood by those of ordinary skill in the art.

Principles of the present invention may also be extended to other elements in a computer system. For example, a multiplier may be implemented in accordance with a preferred embodiment of the present invention to allow for partial word parallel multiplications in addition to whole word multiplications.

For example, FIG. 7 shows a four-bit multiplier in accordance with the prior art. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 201, 202, 203, 204, 205, 206, 207, 208, 209, 210, 211, 212, 213, 214, 215 and 216 may be used to generate partial products for the multiplication. A partial product sum circuit 220 sums the partial products generated by logic AND gates 201 through 216 to produce the result.

The two multiplicands, $X_3X_2X_1X_0$ and $Y_3Y_2Y_1Y_0$, the partial products generated by logic AND gates 201 through 216, and the result produced by partial product sum circuit 220 may be placed in a table in such a way as to summarize operation of the multiplier. For example, such a table is shown as Table 1 below:

TABLE 1

|  |  |  |  | $X_3$ | $X_2$ | $X_1$ | $X_0$ |  |
|---|---|---|---|---|---|---|---|---|
|  |  |  |  | $Y_0X_3$ | $Y_0X_2$ | $Y_0X_1$ | $Y_0X_0$ | $Y_0$ |
|  |  |  | $Y_1X_3$ | $Y_1X_2$ | $Y_1X_1$ | $Y_1X_0$ |  | $Y_1$ |
|  |  | $Y_2X_3$ | $Y_2X_2$ | $Y_2X_1$ | $Y_2X_0$ |  |  | $Y_2$ |
|  | $Y_3X_3$ | $Y_3X_2$ | $Y_3X_1$ | $Y_3X_0$ |  |  |  | $Y_3$ |
| $Z_7$ | $Z_6$ | $Z_5$ | $Z_4$ | $Z_3$ | $Z_2$ | $Z_1$ | $Z_0$ |  |

In the notation used in Table 1 above, the bit position of each bit of both multiplicands and the result is specifically identified. Additionally, the bits of the multiplicand which are used to form each partial product are specifically set out. As is understood by those skilled in the art, the information shown in Table 1 above may be set out using abbreviated or simplified notation, as in Table 2 below:

TABLE 2

|  |  |  | X | X | X | X |  |
|---|---|---|---|---|---|---|---|
|  |  |  | z | z | z | z | Y |
|  |  | z | z | z | z |  | Y |
|  | z | z | z | z |  |  | Y |
| z | z | z | z |  |  |  | Y |
| Z | Z | Z | Z | Z | Z | Z | Z |

In Table 2 above, each bit of the first multiplicand is represented by an "X", each bit of the second multiplicand is represented by a "Y", each bit of a partial product is represented by a "z", and each bit of the result is represented by a "Z". Using the simpler notation of Table 2, an eight-bit multiplier may be described as shown in Table 3 below:

TABLE 3

|  |  |  |  |  |  |  | X | X | X | X | X | X | X | X |  |
|---|---|---|---|---|---|---|---|---|---|---|---|---|---|---|---|
|  |  |  |  |  |  |  | z | z | z | z | z | z | z | z | Y |
|  |  |  |  |  |  | z | z | z | z | z | z | z | z |  | Y |
|  |  |  |  |  | z | z | z | z | z | z | z | z |  |  | Y |
|  |  |  |  | z | z | z | z | z | z | z | z |  |  |  | Y |
|  |  |  | z | z | z | z | z | z | z | z |  |  |  |  | Y |
|  |  | z | z | z | z | z | z | z | z |  |  |  |  |  | Y |
|  | z | z | z | z | z | z | z | z |  |  |  |  |  |  | Y |
| z | z | z | z | z | z | z | z |  |  |  |  |  |  |  | Y |
| Z | Z | Z | Z | Z | Z | Z | Z | Z | Z | Z | Z | Z | Z | Z | Z |

The multiplier shown in Table 3 multiplies an eight-bit first multiplicand $XXXXXXXX_{(base\ 2)}$ with an eight-bit second multiplicand $YYYYYYYY_{(base\ 2)}$ to produce an sixteen-bit result $ZZZZZZZZZZZZZZZZ_{(base\ 2)}$.

Similarly, using the simpler notation of Table 2 and Table 3 (but eliminating spaces between bit positions) a sixteen-bit multiplier may be described as shown in Table 4 below:

TABLE 4

| | | | | | | | | | | | | | | | | X | X | X | X | X | X | X | X | X | X | X | X | X | X | X | X | |
|---|---|---|---|---|---|---|---|---|---|---|---|---|---|---|---|---|---|---|---|---|---|---|---|---|---|---|---|---|---|---|---|---|
| | | | | | | | | | | | | | | | | z | z | z | z | z | z | z | z | z | z | z | z | z | z | z | z | Y |
| | | | | | | | | | | | | | | | z | z | z | z | z | z | z | z | z | z | z | z | z | z | z | z | | Y |
| | | | | | | | | | | | | | | z | z | z | z | z | z | z | z | z | z | z | z | z | z | z | z | | | Y |
| | | | | | | | | | | | | | z | z | z | z | z | z | z | z | z | z | z | z | z | z | z | z | | | | Y |
| | | | | | | | | | | | | z | z | z | z | z | z | z | z | z | z | z | z | z | z | z | z | | | | | Y |
| | | | | | | | | | | | z | z | z | z | z | z | z | z | z | z | z | z | z | z | z | z | | | | | | Y |
| | | | | | | | | | | z | z | z | z | z | z | z | z | z | z | z | z | z | z | z | z | | | | | | | Y |
| | | | | | | | | | z | z | z | z | z | z | z | z | z | z | z | z | z | z | z | z | | | | | | | | Y |
| | | | | | | | | z | z | z | z | z | z | z | z | z | z | z | z | z | z | z | z | | | | | | | | | Y |
| | | | | | | | z | z | z | z | z | z | z | z | z | z | z | z | z | z | z | z | | | | | | | | | | Y |
| | | | | | | z | z | z | z | z | z | z | z | z | z | z | z | z | z | z | z | | | | | | | | | | | Y |
| | | | | | z | z | z | z | z | z | z | z | z | z | z | z | z | z | z | z | | | | | | | | | | | | Y |
| | | | | z | z | z | z | z | z | z | z | z | z | z | z | z | z | z | z | | | | | | | | | | | | | Y |
| | | | z | z | z | z | z | z | z | z | z | z | z | z | z | z | z | z | | | | | | | | | | | | | | Y |
| | | z | z | z | z | z | z | z | z | z | z | z | z | z | z | z | z | | | | | | | | | | | | | | | Y |
| | z | z | z | z | z | z | z | z | z | z | z | z | z | z | z | z | | | | | | | | | | | | | | | | Y |
| z | z | z | z | z | z | z | z | z | z | z | z | z | z | z | z | | | | | | | | | | | | | | | | | Y |
| Z | Z | Z | Z | Z | Z | Z | Z | Z | Z | Z | Z | Z | Z | Z | Z | Z | Z | Z | Z | Z | Z | Z | Z | Z | Z | Z | Z | Z | Z | Z | Z | |

The multiplier shown in Table 4 multiplies a sixteen-bit first multiplicand $XXXXXXXXXXXXXXXX_{(base\ 2)}$ with a sixteen-bit second multiplicand $YYYYYYYYYYYYYYYY_{(base\ 2)}$ to produce a thirty-two-bit result $ZZZZZZZZZZZZZZZZZZZZZZZZZZZZZZZZ_{(base\ 2)}$.

Figure 8:
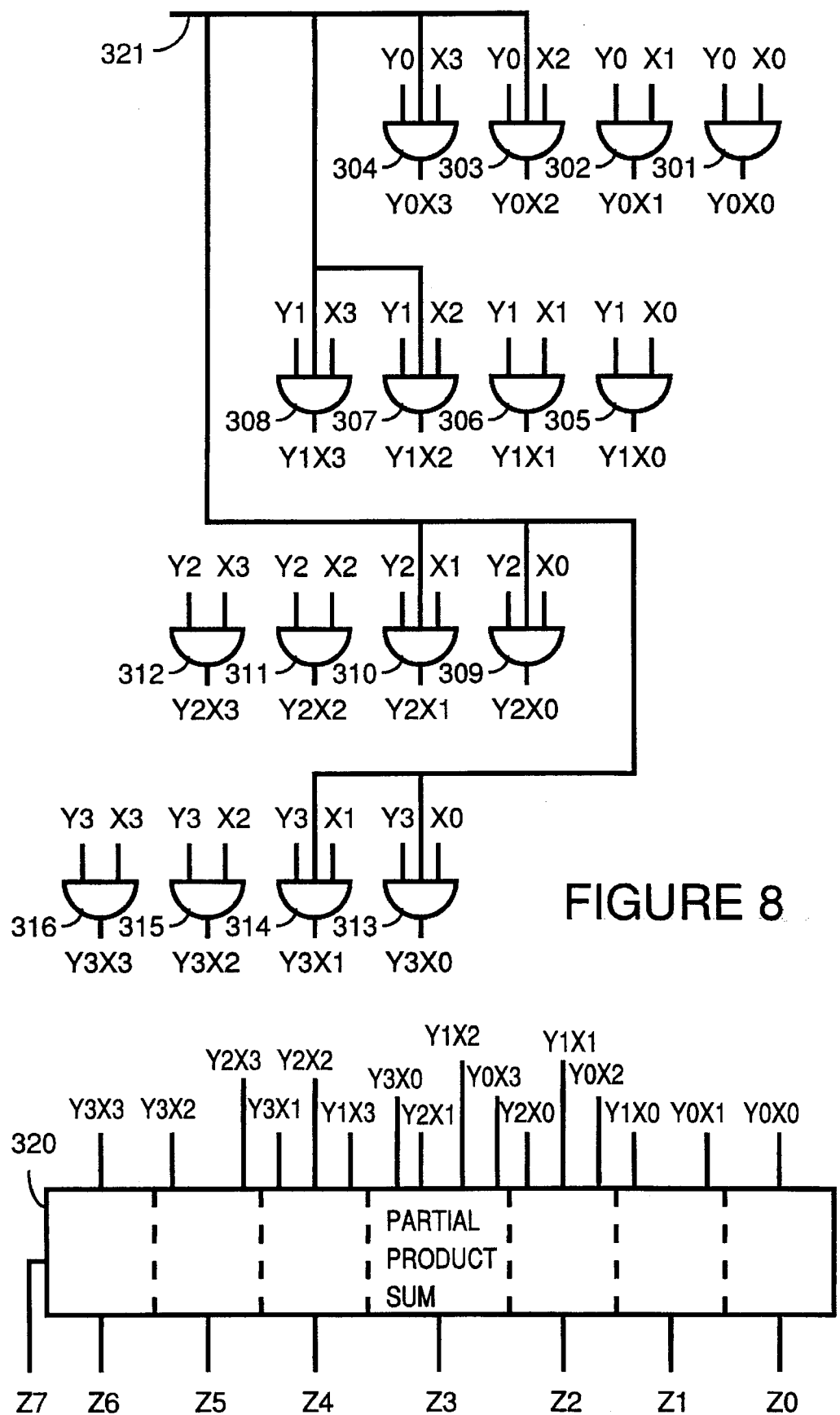
FIG. 8 and FIG. 9 show a multiplier implemented in accordance with preferred embodiments of the present invention.

In accordance with preferred embodiments of the present invention, a standard multiplier may be modified to implement a multiplier which provides parallel multiplication of partial words in addition to multiplication of whole words. For example, FIG. 8 shows a four-bit multiplier in accordance with the preferred embodiment of the present invention. Logic AND gates 301, 302, 303, 304, 305, 306, 307, 308, 309, 310, 311, 312, 313, 314, 315 and 316 generate partial products for the multiplication. A partial product sum circuit 320 sums the partial products generated by logic AND gates 301 through 316 to produce the result.

In the multiplier shown in FIG. 8, partial product sum circuit 320 may be implemented exactly the same as partial product sum circuit 220 shown in FIG. 7. The difference between the multiplier shown in FIG. 8 and the multiplier shown in FIG. 7, is the addition of a control line 321, which is connected to an additional input included in each of logic AND gates 303, 304, 307, 308, 309, 310, 313 and 314.

As shown in FIG. 8, when control line 321 is set at logic 1, the multiplier performs a whole word multiplication on a four-bit first multiplicand $X_3X_2X_1X_0$ (base 2) and a four-bit second multiplicand $Y_3Y_2Y_1Y_0$ (base 2) to produce an eight-bit result $Z_7Z_6Z_5Z_4Z_3Z_2Z_1Z_0$ (base 2). The two multiplicands, $X_3X_2X_1X_0$ and $Y_3Y_2Y_1Y_0$, the partial products generated by logic AND gates 301 through 316, and the result produced by partial product sum circuit 320 may be represented in table form as shown in Table 5 below:

TABLE 5

| | | | | $X_3$ | $X_2$ | $X_1$ | $X_0$ | |
|---|---|---|---|---|---|---|---|---|
| | | | | $Y_0X_3$ | $Y_0X_2$ | $Y_0X_1$ | $Y_0X_0$ | $Y_0$ |
| | | | $Y_1X_3$ | $Y_1X_2$ | $Y_1X_1$ | $Y_1X_0$ | | $Y_1$ |
| | | $Y_2X_3$ | $Y_2X_2$ | $Y_2X_1$ | $Y_2X_0$ | | | $Y_2$ |
| | $Y_3X_3$ | $Y_3X_2$ | $Y_3X_1$ | $Y_3X_0$ | | | | $Y_3$ |
| $Z_7$ | $Z_6$ | $Z_5$ | $Z_4$ | $Z_3$ | $Z_2$ | $Z_1$ | $Z_0$ | |

A comparison of Table 5 with Table 1 above, confirms that when line 321 is set to logic 1, operation of the multiplier shown in FIG. 8 is identical to operation of the multiplier shown in FIG. 7. Therefore, similar to Table 2 above, the simplified notation may be used to describe operation of the multiplier shown in FIG. 8 as in Table 6 below:

TABLE 6

| | | | | X | X | X | X | |
|---|---|---|---|---|---|---|---|---|
| | | | | z | z | z | z | Y |
| | | | z | z | z | z | | Y |
| | | z | z | z | z | | | Y |
| | z | z | z | z | | | | Y |
| Z | Z | Z | Z | Z | Z | Z | Z | |

Figure 9:
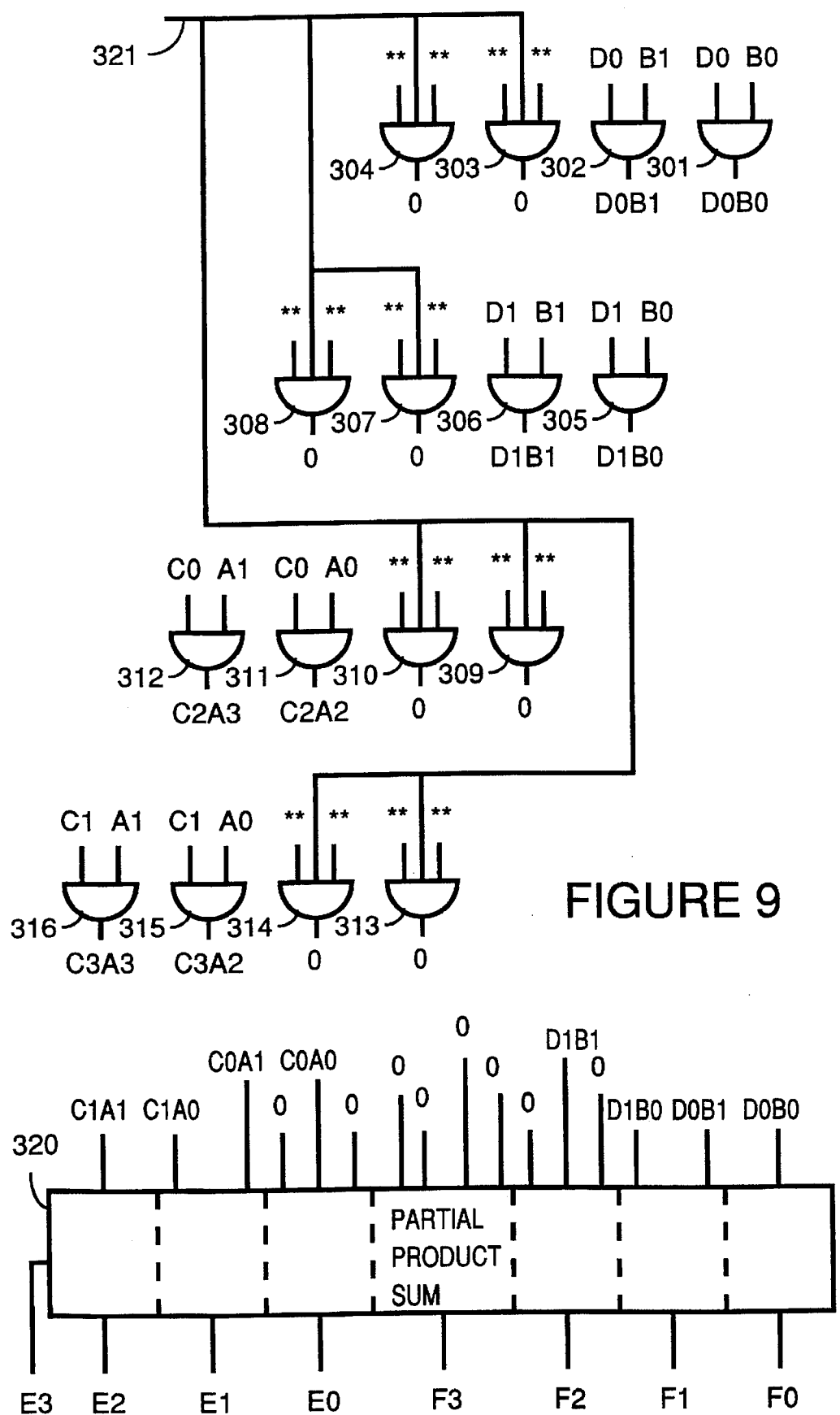

FIG. 9 shows the multiplier shown in FIG. 8, except however that control line 321 is set at logic 0. This forces half the partial products to zero allowing the multiplier to perform parallel multiplication of partial (two-bit) words. That is, in a first multiplication, a two-bit multiplicand $A_1A_0$ (base 2) is multiplied by a two-bit multiplicand $C_1C_0$ (base 2) to produce a four-bit result $E_3E_2E_1E_0$ (base 2). In a second multiplication, a two-bit multiplicand $B_1B_0$ (base 2) is multiplied by a two-bit multiplicand $D_1D_0$ (base 2) to produce a four-bit result $F_3F_2F_1F_0$ (base 2). The partial products not used for the parallel multiplications are forced to logic zero. The parallel multiplication may be represented in table form as shown in Table 7 below:

TABLE 7

| | | | | $A_1$ | $A_0$ | $B_1$ | $B_0$ | |
|---|---|---|---|---|---|---|---|---|
| | | | | 0 | 0 | $D_0B_1$ | $D_0B_0$ | $D_0$ |
| | | | 0 | 0 | $D_1B_1$ | $D_1B_0$ | | $D_1$ |
| | | $C_0A_1$ | $C_0A_0$ | 0 | 0 | | | $C_0$ |
| | $C_1A_1$ | $C_1A_0$ | 0 | 0 | | | | $C_1$ |
| $E_3$ | $E_2$ | $E_1$ | $E_0$ | $F_3$ | $F_2$ | $F_1$ | $F_0$ | |

Using the simplified notation first introduced in Table 2, the multiplier shown in FIG. 9 may be represented as in Table 8 below:

TABLE 8

|   |   |   |   | A | A | B | B |   |
|---|---|---|---|---|---|---|---|---|
|   |   |   |   | 0 | 0 | f | f | D |
|   |   |   | 0 | 0 | f | f |   | D |
|   |   | e | e | 0 | 0 |   |   | D |
|   | e | e | 0 | 0 |   |   |   | D |
| E | E | E | E | F | F | F | F |   |

As illustrated by Table 7 and Table 8, parallel multiplication of partial words is implemented in a multiplier by forcing selected partial products in the multiplier to zero. In general, a standard multiplier of any size may be utilized to perform parallel multiplication by forcing unused partial products to zero. The partial products are forced to logic 0, for example, by using one or more control inputs and three input logic AND gates (or their equivalents).

For example, as discussed above, an eight-bit multiplier may be implemented as described by Table 3. This same multiplier may be utilized to perform parallel multiplication of partial word multiplicands by providing circuitry, such as shown in FIG. 8 and FIG. 9, to force partial products to zero in accordance with the teaching of the present invention. No modification is necessary to the partial product sum circuitry. Thus, modifying the multiplier described by Table 3 in accordance with the teaching of the present invention allows, for example, the performance of two parallel multiplications using four-bit multiplicands as implemented by Table 9 below:

tiplicand AAAA$_{(base\ 2)}$ is multiplied by a four-bit multiplicand CCCC$_{(base\ 2)}$ to produce an eight-bit result EEEEEEEE$_{(base\ 2)}$. In a second parallel multiplication of partial word multiplicands, a four-bit multiplicand BBBB$_{(base\ 2)}$ is multiplied by a four-bit multiplicand DDDD$_{(base\ 2)}$ to produce an eight-bit result FFFFFFFF$_{(base\ 2)}$. Multiplication of two whole word (eight-bit) multiplicands is implemented by the multiplier by not forcing any of the partial products to zero.

Likewise, as discussed above, a sixteen-bit multiplier may be implemented as shown by Table 4. This same multiplier may be utilized to perform parallel multiplications of partial word multiplicands by providing circuitry, such as shown in FIG. 8 and FIG. 9, to force partial products to zero in accordance with the teaching of the present invention. No modification is necessary to the partial product sum circuitry. Thus, modifying the multiplier described by Table 4 in accordance with the teaching of the present invention allows, for example, the performance of two parallel multiplications using eight-bit (partial word) multiplicands as implemented by Table 10 below:

TABLE 9

|   |   |   |   |   |   |   |   | A | A | A | A | B | B | B | B |   |
|---|---|---|---|---|---|---|---|---|---|---|---|---|---|---|---|---|
|   |   |   |   |   |   |   |   | 0 | 0 | 0 | 0 | f | f | f | f | D |
|   |   |   |   |   |   |   | 0 | 0 | 0 | 0 | f | f | f | f |   | D |
|   |   |   |   |   |   | 0 | 0 | 0 | 0 | f | f | f | f |   |   | D |
|   |   |   |   |   | 0 | 0 | 0 | 0 | f | f | f | f |   |   |   | D |
|   |   |   |   | e | e | e | e | 0 | 0 | 0 | 0 |   |   |   |   | C |
|   |   |   | e | e | e | e | 0 | 0 | 0 | 0 |   |   |   |   |   | C |
|   |   | e | e | e | e | 0 | 0 | 0 | 0 |   |   |   |   |   |   | C |
|   | e | e | e | e | 0 | 0 | 0 | 0 |   |   |   |   |   |   |   | C |
| E | E | E | E | E | E | E | E | F | F | F | F | F | F | F | F |   |

As can be seen from Table 9 above, in a first parallel multiplication of partial word multiplicands, a four-bit mul-

TABLE 10

|   |   |   |   |   |   |   |   |   |   |   |   |   |   |   | A | A | A | A | A | A | A | A | B | B | B | B | B | B | B | B |   |
|---|---|---|---|---|---|---|---|---|---|---|---|---|---|---|---|---|---|---|---|---|---|---|---|---|---|---|---|---|---|---|---|
|   |   |   |   |   |   |   |   |   |   |   |   |   |   |   | 0 | 0 | 0 | 0 | 0 | 0 | 0 | 0 | f | f | f | f | f | f | f | f | D |
|   |   |   |   |   |   |   |   |   |   |   |   |   |   | 0 | 0 | 0 | 0 | 0 | 0 | 0 | 0 | f | f | f | f | f | f | f | f |   | D |
|   |   |   |   |   |   |   |   |   |   |   |   |   | 0 | 0 | 0 | 0 | 0 | 0 | 0 | 0 | f | f | f | f | f | f | f | f |   |   | D |
|   |   |   |   |   |   |   |   |   |   |   |   | 0 | 0 | 0 | 0 | 0 | 0 | 0 | 0 | f | f | f | f | f | f | f | f |   |   |   | D |
|   |   |   |   |   |   |   |   |   |   |   | 0 | 0 | 0 | 0 | 0 | 0 | 0 | 0 | f | f | f | f | f | f | f | f |   |   |   |   | D |
|   |   |   |   |   |   |   |   |   |   | 0 | 0 | 0 | 0 | 0 | 0 | 0 | 0 | f | f | f | f | f | f | f | f |   |   |   |   |   | D |
|   |   |   |   |   |   |   |   |   | 0 | 0 | 0 | 0 | 0 | 0 | 0 | 0 | f | f | f | f | f | f | f | f |   |   |   |   |   |   | D |
|   |   |   |   |   |   |   |   | 0 | 0 | 0 | 0 | 0 | 0 | 0 | 0 | f | f | f | f | f | f | f | f |   |   |   |   |   |   |   | D |
|   |   |   |   |   |   |   | e | e | e | e | e | e | e | e | 0 | 0 | 0 | 0 | 0 | 0 | 0 | 0 |   |   |   |   |   |   |   |   | C |
|   |   |   |   |   |   | e | e | e | e | e | e | e | e | 0 | 0 | 0 | 0 | 0 | 0 | 0 | 0 |   |   |   |   |   |   |   |   |   | C |
|   |   |   |   |   | e | e | e | e | e | e | e | e | 0 | 0 | 0 | 0 | 0 | 0 | 0 | 0 |   |   |   |   |   |   |   |   |   |   | C |
|   |   |   |   | e | e | e | e | e | e | e | e | 0 | 0 | 0 | 0 | 0 | 0 | 0 | 0 |   |   |   |   |   |   |   |   |   |   |   | C |
|   |   |   | e | e | e | e | e | e | e | e | 0 | 0 | 0 | 0 | 0 | 0 | 0 | 0 |   |   |   |   |   |   |   |   |   |   |   |   | C |
|   |   | e | e | e | e | e | e | e | e | 0 | 0 | 0 | 0 | 0 | 0 | 0 | 0 |   |   |   |   |   |   |   |   |   |   |   |   |   | C |
|   | e | e | e | e | e | e | e | e | 0 | 0 | 0 | 0 | 0 | 0 | 0 | 0 |   |   |   |   |   |   |   |   |   |   |   |   |   |   | C |
| e | e | e | e | e | e | e | e | 0 | 0 | 0 | 0 | 0 | 0 | 0 | 0 |   |   |   |   |   |   |   |   |   |   |   |   |   |   |   | C |

TABLE 10-continued

|   |   |   |   |   |   |   |   | A | A | A | A | A | A | A | A | B | B | B | B | B | B | B | B |   |
|---|---|---|---|---|---|---|---|---|---|---|---|---|---|---|---|---|---|---|---|---|---|---|---|---|
|   | e | e | e | e | e | e | e | e | 0 | 0 | 0 | 0 | 0 | 0 | 0 | 0 |   |   |   |   |   |   |   | C |
|   |   | e | e | e | e | e | e | e | 0 | 0 | 0 | 0 | 0 | 0 | 0 | 0 |   |   |   |   |   |   |   | C |
| E | E | E | E | E | E | E | E | E | E | E | E | E | E | E | F | F | F | F | F | F | F | F | F | F | F | F | F | F | F |

As can be seen from Table 10 above, in a first parallel multiplication, an eight-bit multiplicand AAAAAAAA$_{(base\ 2)}$ is multiplied by an eight-bit multiplicand CCCCCCCC$_{(base\ 2)}$ to produce a sixteen-bit result EEEEEEEEEEEEEEEE$_{(base\ 2)}$. In a second parallel multiplication, an eight-bit multiplicand BBBBBBBB$_{(base\ 2)}$ is multiplied by an eight-bit multiplicand DDDDDDDD$_{(base\ 2)}$ to produce a sixteen-bit result FFFFFFFFFFFFFFFF$_{(base\ 2)}$. Multiplication of two whole word (sixteen-bit) multiplicands is implemented by the multiplier by not forcing any of the partial products to zero.

While the above description has showed parallel multiplication of half words, it will be understood by persons of ordinary skill in the art that both the number of parallel multiplications performed and the size of the partial word may be varied by selecting the appropriate partial products to force to zero.

For example, the sixteen-bit multiplier implemented as described by Table 4 (and/or Table 10) may be utilized to perform three simultaneous parallel multiplications by providing circuitry, such as shown in FIG. 8 and FIG. 9, to force partial products to zero in accordance with the teaching of the present invention. Thus, modifying the multiplier described by Table 4 in accordance with the teaching of the present invention allows, for example, the performance of one parallel multiplication using eight-bit multiplicands and two parallel multiplication using four-bit multiplicands as implemented by Table 11 below:

multiplication, a four-bit multiplicand CCCC$_{(base\ 2)}$ is multiplied by a four-bit multiplicand FFFF$_{(base\ 2)}$ to produce an eight-bit result IIIIIIII$_{(base\ 2)}$. As will be understood by those skilled in the art, for every partial product shown in Table 11 with a value of zero, it is necessary to have a three input logic AND gate or its logic equivalent to allow the partial product to be forced to zero when performing parallel multiplication operations. However, when a mixture of different sized partitions are done, as in Table 11, in some implementations different control inputs may be needed to force different partial product terms to zero, as will be understood by those of ordinary skill in the art.

As may be understood from the above-discussion, by selectively forcing partial products of a multiplier to zero, parallel multiplication of partial words may be fully implemented in a multiplier. The size of the word, the number of parallel multiplications simultaneously performed and the size of the partial words may be freely varied in accordance with the teaching of the present invention.

Figure 11:
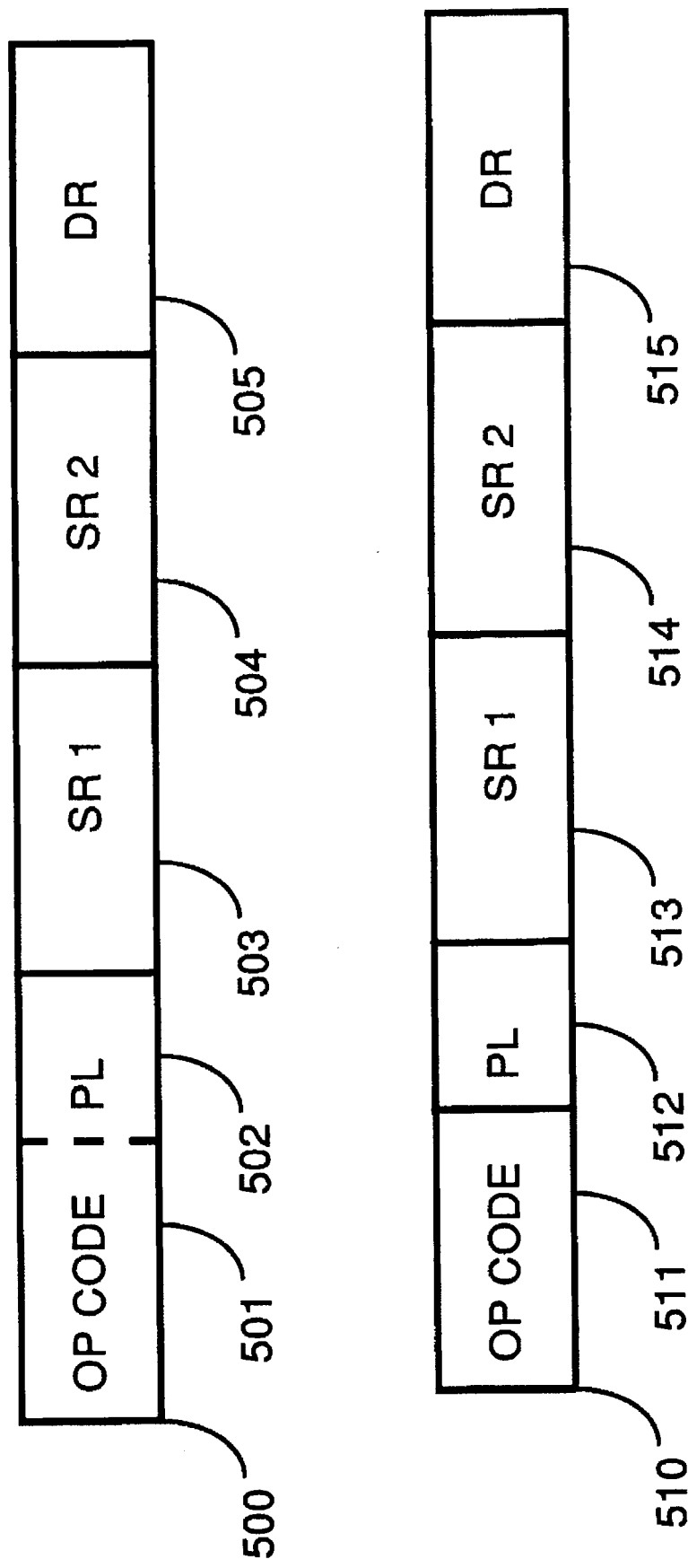
FIG. 11 shows an example of an instruction layout in accordance with an alternate preferred embodiment of the present invention.

FIG. 11 shows an example of instructions that can be executed in accordance with the preferred embodiment of the present invention. For example, instruction 500 includes a field 501, a subfield 502 of field 501, a field 503, a field 504 and a field 505. Field 501 sets out the op code. Field 501 sets out, for example, an add, a shift and add, a subtract, a shift and subtract, a shift left, a shift right, a multiply, or any number of other operations. Subfield 502 of 501 indicates whether the operation is to be performed as parallel

TABLE 11

|   |   |   |   |   |   |   |   | A | A | A | A | A | A | A | A | B | B | B | B | C | C | C | C |
|---|---|---|---|---|---|---|---|---|---|---|---|---|---|---|---|---|---|---|---|---|---|---|---|
|   |   |   |   |   |   |   |   |   |   |   |   |   |   |   | 0 | 0 | 0 | 0 | 0 | 0 | 0 | 0 | 0 | 0 | 0 | 0 | i | i | i | i | F |
|   |   |   |   |   |   |   |   |   |   |   |   |   |   | 0 | 0 | 0 | 0 | 0 | 0 | 0 | 0 | 0 | 0 | 0 | 0 | 0 | i | i | i | i | F |
|   |   |   |   |   |   |   |   |   |   |   |   |   | 0 | 0 | 0 | 0 | 0 | 0 | 0 | 0 | 0 | 0 | 0 | 0 | 0 | i | i | i | i | F |
|   |   |   |   |   |   |   |   |   |   |   |   | 0 | 0 | 0 | 0 | 0 | 0 | 0 | 0 | 0 | 0 | 0 | 0 | 0 | i | i | i | i | F |
|   |   |   |   |   |   |   |   |   |   |   | 0 | 0 | 0 | 0 | 0 | 0 | 0 | 0 | h | h | h | h | 0 | 0 | 0 | 0 |   |   |   |   | E |
|   |   |   |   |   |   |   |   |   |   | 0 | 0 | 0 | 0 | 0 | 0 | 0 | 0 | h | h | h | h | 0 | 0 | 0 | 0 |   |   |   |   |   | E |
|   |   |   |   |   |   |   |   |   | 0 | 0 | 0 | 0 | 0 | 0 | 0 | 0 | h | h | h | h | 0 | 0 | 0 | 0 |   |   |   |   |   |   | E |
|   |   |   |   |   |   |   |   | 0 | 0 | 0 | 0 | 0 | 0 | 0 | 0 | h | h | h | h | 0 | 0 | 0 | 0 |   |   |   |   |   |   |   | E |
|   |   |   |   |   |   |   | g | g | g | g | g | g | g | g | 0 | 0 | 0 | 0 | 0 | 0 | 0 | 0 |   |   |   |   |   |   |   |   | D |
|   |   |   |   |   |   | g | g | g | g | g | g | g | g | 0 | 0 | 0 | 0 | 0 | 0 | 0 | 0 |   |   |   |   |   |   |   |   |   | D |
|   |   |   |   |   | g | g | g | g | g | g | g | g | 0 | 0 | 0 | 0 | 0 | 0 | 0 | 0 |   |   |   |   |   |   |   |   |   |   | D |
|   |   |   |   | g | g | g | g | g | g | g | g | 0 | 0 | 0 | 0 | 0 | 0 | 0 | 0 |   |   |   |   |   |   |   |   |   |   |   | D |
|   |   |   | g | g | g | g | g | g | g | g | 0 | 0 | 0 | 0 | 0 | 0 | 0 | 0 |   |   |   |   |   |   |   |   |   |   |   |   | D |
|   |   | g | g | g | g | g | g | g | g | 0 | 0 | 0 | 0 | 0 | 0 | 0 | 0 |   |   |   |   |   |   |   |   |   |   |   |   |   | D |
|   | g | g | g | g | g | g | g | g | 0 | 0 | 0 | 0 | 0 | 0 | 0 | 0 |   |   |   |   |   |   |   |   |   |   |   |   |   |   | D |
| G | G | G | G | G | G | G | G | G | G | G | G | G | G | G | H | H | H | H | H | H | H | I | I | I | I | I | I | I | I |

As can be seen from Table 11 above, in a first parallel multiplication, an eight-bit multiplicand AAAAAAAA$_{(base\ 2)}$ is multiplied by an eight-bit multiplicand DDDDDDDD$_{(base\ 2)}$ to produce a sixteen-bit result GGGGGGGGGGGGGGGG$_{(base\ 2)}$. In a second parallel multiplication, a four-bit multiplicand BBBB$_{(base\ 2)}$ is multiplied by a four-bit multiplicand EEEE$_{(base\ 2)}$ to produce an eight-bit result HHHHHHHH$_{(base\ 2)}$. In a third parallel operations, and if so, what is the size of the operands. Field 503 indicates a first source register. Field 504 indicates a second source register. Field 505 indicates a destination register.

As will be understood in the art, instruction 500 illustrates one of many possible ways an instruction can be organized. For example, instruction 510 shows an alternate embodiment in that the parallel operation indication is in a separate field. Specifically, instruction 510 includes a field 511, a field 512, a field 513, a field 514 and a field 515. Field 511 sets out the op code. Field 511 sets out, for example, an add, a shift and add, a subtract, a shift and subtract, a shift left, a shift right, a multiply, or any number of other operations. Field 512 indicates whether the operation is to be performed as parallel operations, and if so, what is the size of the operands. Field 513 indicates a first source register. Field 514 indicates a second source register. Field 515 indicates a destination register.

As will be understood in the art, the present invention also works for other multipliers where partial products are generated. For example, the present invention also may be utilized in a Booth-encoded multiplier. In a Booth-encoded multiplier, fewer rows of partial product terms are generated by considering more than one bit of the multiplier (y-multiplicand) for each row of the partial product term. See for example, John Hennessy & David Patterson, *Computer Architecture, A Quantitative Approach*, Morgan Kaufmann, 1990, Appendix, pp. A-39 through A-49. As, in the case of the multiplier above, the value of some partial product terms generated by the Booth-encoded multiplier are changed to take into account the parallel processing, as will be understood by those skilled in the art.

More specifically, for a Booth-encoded multiplier, the AND gates 301 through 316 shown in FIGS. 8 and 9 are replaced by multiplexors. For example, a Booth-encoded multiplier using the "overlapping triplets" method examines three bits of the multiplier (i.e., y multiplicand) each time, instead of one bit each time, to generate a row of partial products that is one of +x, +2x, −2x, −x or zero, instead of a row of partial products which is always +x or 0 as in the multiplier shown in FIGS. 8 and 9. This may be implemented as a five-to-one multiplexor. The name "overlapping triplets" is due to the fact that this method looks at three bits of the multiplier (y multiplicand) and retires two bits of the multiplier (y multiplicand) for each row. The overlapping occurs when, for the next row, the least significant bit of the three multiplier (y multiplicand) bits used by this next row was the most significant bit of the three multiplier bits used from the previous row.

To implement parallel sub-word multiplication, the bits of the x multiplicand that do not correspond to the sub-word product whose partial product rows are being formed are set to zero. This can be implemented with multiplexors like in the unmodified Booth-encoded multiplier, modifying the control signals to the multiplexors. The sign of the partial product row may also be used as an additional input to the multiplexors.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for providing parallel data processing within a single processor, the parallel data processing including performing addition and subtraction, the method comprising the steps of:

(a) performing within each of a plurality of partitions implemented in hardware, a first operation on a set of bits from at least operand, including performing within each of the plurality of partitions a preshift operation on a subset of the set of bits, the plurality of partitions including first partition circuitry which performs an arithmetic operation on a first set of bits to produce first results and second partition circuitry, having an identical logical structure as the first partition circuitry, which performs the arithmetic operation on a second set of bits to produce second results;

(b) when performing the first operation on at least one full word length operand, allowing data to affect calculations across boundaries between the plurality of partitions, including allowing preshifts to propogate between the partitions; and (c) when performing the first operation in parallel using a plurality of less than one full word length operands, performing the following substep, (c.1) preventing data from affecting calculations across at least one boundary between the plurality of partitions, including preventing preshifts from propagating across the at least one boundary between the plurality of partitions;

wherein step (b) and step (c) are performed utilizing first selection means, coupled between the first partition circuitry and the second partition circuitry, for allowing data to propagate from the first partition circuitry to the second partition circuitry and for preventing data from propagating from the first partition circuitry to the second partition circuitry.

2. A method as in claim 1 wherein step (a) includes performing within each of the plurality of partitions an addition operation on the set of bits;

step (b) includes allowing carries to propagate between the partitions; and step (c) includes preventing a carry from propagating across at least one boundary between the plurality of partitions when performing the first operation in parallel.

3. A method as in 1 wherein each partition includes a one-bit adder.

4. A method as in claim 1, wherein each of the plurality of partitions is one half word in width.

5. A method as in claim 1 wherein the plurality of partitions comprise a shifter implemented using multiplexors.

6. A multiplier which multiplies multiplicands, the multiplier implementing both whole word multiplication of whole word multiplicands and implementing parallel multiplication of sub-word multiplicands, the multiplier comprising:

partial product generation means for generating partial products from the multiplicands;

partial product sum circuitry, coupled to the partial product generation means, for summing the partial products to produce a result;

selection means for selecting one of whole word multiplication and parallel multiplication of sub-word multiplicands; and, partial product selection means, coupled to the partial product generation means and to the selection means, for in response to the selection means selecting parallel multiplication of sub-word multiplicands forcing selected partial products to have a new value, thereby implementing parallel multiplication of sub-word multiplicands.

7. A multiplier as in claim 6 wherein the partial product selection means, in response to the selection means selecting parallel multiplication of sub-word multiplicands, forces the selected partial products to have a value of 0.

8. A multiplier as in claim 7 wherein the partial product generation means comprises an array of logic AND gates, each logic AND gate in the array of logic AND gates generating a partial product.

9. A multiplier as in claim 8 wherein the partial product selection means comprises third inputs to at least a portion of the logic AND gates.

10. A multiplier as in claim 7 wherein when the multiplier is implementing whole word multiplication, the partial product selection means does not force any partial products to have a value of 0.

11. A multiplier as claim 6 wherein the multiplier is a Booth-encoded multiplier.

12. A method for performing multiplication of multiplicands, the method performing both multiplication of whole word multiplicands and parallel multiplication of sub-word multiplicands, using a single hardware multiplier, the method comprising the steps of:

(a) generating partial products from the multiplicands;

(b) in response to a selection to perform parallel multiplication of sub-word multiplicands, forcing selected partial products to have a new value; and, (c) summing the partial products to produce a result, the summing performed using partial product sum circuitry, when in step (b) the selected partial products are forced to have new values, using the new values when summing the partial products to produce the result.

13. A method as in claim 12 wherein step (b) includes in response to the selection to perform parallel multiplication of sub-word multiplicands, forcing selected partial products to have a value of 0.

14. A method as in claim 13 wherein step (a) is performed using an array of logic AND gates, each logic AND gate in the array of logic AND gates generating a partial product.

15. A method as in claim 14 wherein in step (b) forcing selected partial products to have a value of 0 is implemented by placing a logic 0 on inputs to a portion of the logic AND gates.

16. A method as in claim 13 wherein in step (b) when the multiplier is implementing whole word multiplication, not forcing any partial products to have a value of 0.

17. A processing system comprising:

an arithmetic logic unit which performs parallel addition and parallel subtraction, the arithmetic logic unit including:

first partition circuitry which performs an arithmetic operation on a first set of bits from a plurality of operands to produce first results, the first partition circuitry performing the arithmetic operation on low order bits of the plurality of operands, second partition circuitry, having an identical logic structure as the first partition circuitry, which performs the arithmetic operation on a second set of bits from the plurality of operands to produce second results, the second partition circuitry performing the arithmetic operation on high order bits of the plurality of operands, and first selection means, coupled between the first partition circuitry and the second partition circuitry, for allowing data to propagate from the first partition circuitry to the second partition circuitry and for preventing data from propagating from the first partition circuitry to the second partition circuitry; and, a preshifter coupled to an input of the arithmetic logic unit, for preshifting a subset of the first set of bits and for preshifting a subset of the second set of bits the second set of bits before the subset of the first set of bits and the subset of the second set of bits is received by the arithmetic logic unit;

wherein when the data is allowed to propagate from the first partition circuitry to the second partition circuitry, preshifts by the preshifter are allowed to propagate from the subset of the first set of bits to the subset of the second set of bits, and the arithmetic operation is performed on full word length operands to produce results which are of full word length, the results including a concatenation of the second results and the first results; and, wherein when the data is prevented from propagating from the first partition circuitry to the second partition circuitry, preshifts by the preshifter are not allowed to propagate from the subset of the first set of bits to the subset of the second set of bits, and the arithmetic operation is performed in parallel operands with bit lengths which are smaller than a bit length of the full word length operands.

18. A processing system as in claim 17, wherein the arithmetic logic unit additionally includes:

third partition circuitry which performs the arithmetic operation on a third set of bits from a plurality of operands;

fourth partition circuitry which performs the arithmetic operation on a fourth set of bits from the plurality of operands;

second selection means, coupled between the second partition circuitry and the third partition circuitry, for allowing data to propagate from the second partition circuitry to the third partition circuitry when performing the arithmetic operation on full word length operands, and for allowing prevention of data from propagating from the second partition circuitry to the third partition circuitry when performing the arithmetic operation in parallel on the operands with bit lengths which are smaller than a bit length of the full word length operands; and, third selection means, coupled between the third partition circuitry and the fourth partition circuitry, for allowing data to propagate from the third partition circuitry to the fourth partition circuitry when performing the arithmetic operation on full word length operands, and for allowing prevention of data from propagating from the third partition circuitry to the fourth partition circuitry when performing the arithmetic operation in parallel on the operands with bit lengths which are smaller than a bit length of the full word length operands.

19. A processing system as in claim 17 wherein the arithmetic logic unit implements parallel operations on operands in response to a single instruction.

20. A processing as in claim 17 wherein each of the first partition circuitry and the second partition circuitry comprises a carry look-ahead adder.

21. A processor which allows parallel data processing, the processor comprising:

an arithmetic logic unit which performs parallel addition and parallel subtraction, the arithmetic logic unit including a plurality of partitions implemented in hardware, each partition for performing a first operation on a set of bits from at least one operand, each of the plurality of partitions having an identical logic structure; and, a plurality of selection means, each of the plurality of selection means being coupled between two partitions from the plurality of partitions, and each of the plurality of selection means responsive to a selection of operand size to allow and prevent data transfer between the two partitions; and, a preshifter coupled to an input of the arithmetic logic unit, the preshifter including a plurality of shift register partitions, each shift register partition for shifting a set of bits from an operand, and at least one selecting means, each of the at least one selecting means being coupled between two shift register partitions from the plurality of shift register partitions, and each of the at least one selecting means responsive to a selection of operand size to allow and prevent shifting of data bits between the two shift register partitions.

22. A processor as in claim 21, wherein each of the plurality of partitions is one quarter word in width.

23. A processor as in claim 21, wherein each of the plurality of partitions is one bit wide and wherein the processor additionally comprises a means for selecting which of the selection means allow data to transfer between partitions and which of the selection means prevents data from transferring between partitions.

24. A processor as in claim 21, wherein each partition includes a one-bit adder, and each selection means is a selector which forwards or intercepts a carry propagating between two one bit adders.

25. A processor as in claim 21, wherein each of the plurality of partitions is one half word in width.

26. A processor as in claim 21, additionally comprising a shifter.

27. A processor as in claim 21, wherein each partition performs a carry look-ahead addition.

28. A method for providing for parallel data processing within a single processor, the method comprising the steps of:

(a) performing, by first partition circuitry, an arithmetic operation on a first set of bits from at least one operand to generate first results, including performing a preshift on a subset of the first set of bits;

(b) performing, by second partition circuitry, the arithmetic operation on a second set of bits from the at least one operand to generate second results, including performing a preshift on a subset of the second set of bits;

(c) when performing the arithmetic operation on full word length operands allowing data from the first partition circuitry to affect calculation of the second results, results of the addition operation being the concatenation of the second results and the first results; and, (d) when performing the arithmetic operation in parallel on lit operands, performing the following substep, (d.1) preventing data from the first partition circuitry to affect the calculation of the second results, including preventing the preshift on the subset of the first set of bits from propagating across to the subset of the second set of bits;

wherein step (c) and step (d) are performed utilizing first selection means, coupled between the first partition circuitry and the second partition circuitry, for allowing data to propagate from the first partition circuitry to the second partition circuitry and for preventing data from propagating from the first partition circuitry to the second partition circuitry.

29. A method as in claim 28 wherein:

step (a) includes performing an addition operation on low order bits of the plurality of operands;

step (b) includes an addition operation on high order bits of the plurality of operands;

step (c) includes allowing a carry from the first partition circuitry to affect the calculation of results by the second partition circuitry when performing the addition on full word length operands; and, step (d) includes preventing a carry from the first partition circuitry to affect the calculation of results by the second partition circuitry when performing parallel addition on operands.

30. A method as in claim 29 wherein:

step (a) includes performing a carry look-ahead addition operation on low order bits of the plurality of operands; and, step (b) includes performing a carry look-ahead addition operation on high order bits of the plurality of operands.

31. A method as in claim 28 wherein:

step (a) includes performing a subtraction operation on low order bits of the plurality of operands; and, step (b) includes performing a subtraction operation on high order bits of the plurality of operands.

32. A method as in claim 31 wherein:

step (a) includes performing a carry-propagate addition operation on low order bits of the plurality of operands;

step (b) includes a carry-propagate addition operation on high order bits of the plurality of operands;

step (c) includes allowing a carry from propagating to the second partition circuitry when performing the addition on full word length operands; and, step (d) includes preventing a carry from propagating to the second partition circuitry when performing parallel addition on operands.

* * * * *

UNITED STATES PATENT AND TRADEMARK OFFICE
CERTIFICATE OF CORRECTION

PATENT NO.   : 5,636,351
DATED        : June 3, 1997
INVENTOR(S)  : Lee

It is certified that error appears in the above-identified patent and that said Letters Patent is hereby corrected as shown below:

Column 6,
Line 19, delete "13 1." and insert therefor -- 131. --

Column 8,
Line 39, delete "fight" and insert therefor -- right --

Column 17,
Line 5, delete "fight" and insert therefor -- right --

Column 18,
Line 10, delete "propogate" and insert therefor -- propagate --

Column 20,
Line 18, after "parallel" insert -- on --

Column 21,
Line 53, after "on" delete "lit"

Signed and Sealed this

Sixth Day of May, 2003

JAMES E. ROGAN
*Director of the United States Patent and Trademark Office*